United States Patent
Baba

(10) Patent No.: US 8,604,946 B2
(45) Date of Patent: Dec. 10, 2013

(54) DATA PROCESSING DEVICE AND DATA PROCESSING METHOD

(75) Inventor: Daisuke Baba, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/643,709

(22) PCT Filed: Mar. 19, 2012

(86) PCT No.: PCT/JP2012/001890
§ 371 (c)(1),
(2), (4) Date: Oct. 26, 2012

(87) PCT Pub. No.: WO2012/137428
PCT Pub. Date: Oct. 11, 2012

(65) Prior Publication Data
US 2013/0038474 A1 Feb. 14, 2013

(30) Foreign Application Priority Data

Apr. 8, 2011 (JP) ................................. 2011-086313

(51) Int. Cl.
*H03M 7/00* (2006.01)

(52) U.S. Cl.
USPC .................................. 341/60; 341/50; 341/51

(58) Field of Classification Search
USPC .................. 341/50, 51, 60; 312/224; 708/209
See application file for complete search history.

(56) References Cited

U.S. PATENT DOCUMENTS

| | | | |
|---|---|---|---|
| 5,734,874 A * | 3/1998 | Van Hook et al. | 345/559 |
| 6,275,834 B1 * | 8/2001 | Lin et al. | 708/209 |
| 6,438,676 B1 | 8/2002 | Sijstermans | |
| 7,027,516 B2 * | 4/2006 | Anderson et al. | 375/240.26 |
| 7,334,116 B2 * | 2/2008 | Iwata | 712/300 |
| 7,962,049 B2 * | 6/2011 | Mateosky et al. | 398/208 |
| 2006/0093045 A1 * | 5/2006 | Anderson et al. | 375/240.28 |
| 2006/0149939 A1 | 7/2006 | Paver et al. | |
| 2008/0077643 A1 | 3/2008 | Handa | |

FOREIGN PATENT DOCUMENTS

| | | |
|---|---|---|
| JP | 2000-99327 | 4/2000 |
| JP | 2002-522821 | 7/2002 |
| JP | 2005-535966 | 11/2005 |
| JP | 2008-83795 | 4/2008 |

OTHER PUBLICATIONS

International Search Report issued Jun. 19, 2012 in corresponding International Application No. PCT/JP2012/001890.

\* cited by examiner

*Primary Examiner* — Jean B Jeanglaude
(74) *Attorney, Agent, or Firm* — Wenderoth, Lind & Ponack, L.L.P.

(57) ABSTRACT

A decoder reads an instruction for information specifying a bit sequence storage area, information indicating a first bit range, and information indicating a second bit range that is contiguous with the first bit range, then outputs a decoded signal in response to the information so read, and a bit manipulation circuit generates and outputs an output sequence based on a bit sequence stored in the bit sequence storage area by inserting uniform predetermined values between a first bit range and a second bit range in accordance with the decoded signal output from the decoder.

8 Claims, 22 Drawing Sheets

FIG. 3

Decoded signal correspondence table 200

| instruction format ~210 | sign ~220 | mask_dir ~230 | operation ~240 | N ~250 | width ~260 | shift_len ~270 | read_addr ~280 | write_addr ~290 |
|---|---|---|---|---|---|---|---|---|
| shrnhN B, A shift_len, width | 0 (zero-extension) | 0 (MSB fixed) | 0 (shrinkage instruction) | 8 or 16 or 32 | width | shift_len | addr A | addr B |
| shrnlN B, A shift_len, width | 0 (zero-extension) | 1 (LSB fixed) | 0 (shrinkage instruction) | 8 or 16 or 32 | width | shift_len | addr A | addr B |
| shrnlsN B, A shift_len, width | 1 (sign extension) | 1 (LSB fixed) | 0 (shrinkage instruction) | 8 or 16 or 32 | width | shift_len | addr A | addr B |
| extrhN B, A shift_len, width | 0 (zero-extension) | 0 (MSB fixed) | 1 (extension instruction) | 8 or 16 or 32 | width | shift_len | addr A | addr B |
| extrlN B, A shift_len, width | 0 (zero-extension) | 1 (LSB fixed) | 1 (extension instruction) | 8 or 16 or 32 | width | shift_len | addr A | addr B |
| extrlsN B, A shift_len, width | 1 (sign extension) | 1 (LSB fixed) | 1 (extension instruction) | 8 or 16 or 32 | width | shift_len | addr A | addr B |

FIG. 6

| operation (510) | mask_dir (520) | width (530) | ext_mask(N bit) (540) |
|---|---|---|---|
| 0 | X | X | 0000....0000 |
| 1 | 0 | 0 | 0000....0000 |
| 1 | 0 | 1 | 0000....0001 |
| 1 | 0 | 2 | 0000....0011 |
| ... | ... | ... | ... |
| 1 | 0 | N-2 | 0111....1111 |
| 1 | 0 | N-1 | 1111....1111 |
| 1 | 1 | 0 | 0000....0000 |
| 1 | 1 | 1 | 1000....0000 |
| 1 | 1 | 2 | 1100....0000 |
| ... | ... | ... | ... |
| 1 | 1 | N-2 | 1111....1110 |
| 1 | 1 | N-1 | 1111....1111 |

FIG. 7

| mask_dir (610) | mask_width (620) | mask(N bit) (630) |
|---|---|---|
| 0 | 0 | 0000....0000 |
| 0 | 1 | 0000....0001 |
| 0 | 2 | 0000....0011 |
| ... | ... | ... |
| 0 | N-2 | 0111....1111 |
| 0 | N-1 | 1111....1111 |
| 1 | 0 | 0000....0000 |
| 1 | 1 | 1000....0000 |
| 1 | 2 | 1100....0000 |
| ... | ... | ... |
| 1 | N-2 | 1111....1110 |
| 1 | N-1 | 1111....1111 |

FIG. 17

Decoded signal correspondence table 1600

| Instruction format 1610 | sign 1620 | mask_dir 1630 | operation 1640 | N 1650 | M 1655 | width 1660 | shift_len 1670 | read_addr 1680 | write_addr 1690 |
|---|---|---|---|---|---|---|---|---|---|
| shrnhNxM B, A, shift_len, width | 0 (zero-extension) | 0 (MSB fixed) | 0 (shrinkage instruction) | 8 or 16 or 32 | 2 or 4 or 8 | width | shift_len | addr A | addr B |
| shrnlNxM B, A, shift_len, width | 0 (zero-extension) | 1 (LSB fixed) | 0 (shrinkage instruction) | 8 or 16 or 32 | 2 or 4 or 8 | width | shift_len | addr A | addr B |
| shrnlsNxM B, A, shift_len, width | 1 (sign extension) | 1 (LSB fixed) | 0 (shrinkage instruction) | 8 or 16 or 32 | 2 or 4 or 8 | width | shift_len | addr A | addr B |
| extrhNxM B, A, shift_len, width | 0 (zero-extension) | 0 (MSB fixed) | 1 (extension instruction) | 8 or 16 or 32 | 2 or 4 or 8 | width | shift_len | addr A | addr B |
| extrlNxM B, A, shift_len, width | 0 (zero-extension) | 1 (LSB fixed) | 1 (extension instruction) | 8 or 16 or 32 | 2 or 4 or 8 | width | shift_len | addr A | addr B |
| extrlsNxM B, A, shift_len, width | 1 (sign extension) | 1 (LSB fixed) | 1 (extension instruction) | 8 or 16 or 32 | 2 or 4 or 8 | width | shift_len | addr A | addr B |

FIG. 19A

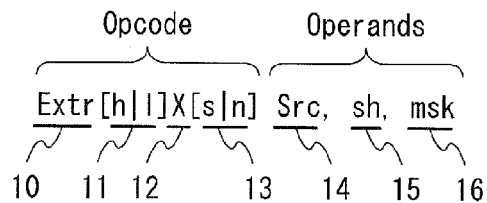

10: Extension instruction
11: h indicates shifting toward less-significant bits,
    l indicates shifting toward more-significant bits
12: Data type (8-bit or 16-bit or 32-bit)
13: Pre-unpacking process
14: Source register ID operand.
    Here, the source register is overwritten with processing results.
15: 5-bit shift length operand
16: 3-bit length operand for bit sequence not subject to shift

FIG. 19B

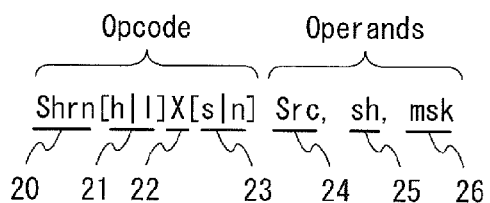

20: Shrinkage instruction
21: h indicates shifting toward more-significant bits,
    l indicates shifting toward less-significant bits
22: Data type (8-bit or 16-bit or 32-bit)
23: Post-packing process
24: Source register ID operand.
    Here, the source register is overwritten with processing results.
25: 5-bit shift length operand
26: 3-bit length operand for bit sequence not subject to shift

DATA PROCESSING DEVICE AND DATA PROCESSING METHOD

TECHNICAL FIELD

The present disclosure pertains to data processing technology for performing bit manipulation on a bit sequence.

BACKGROUND ART

Computer systems typically read and write data to and from a storage device in word units, each unit being made up of a multiple of eight bits (e.g., 16 bits).

Conventionally, in order to effectively use memory areas of the storage device when data made up of a number of bits equivalent to a fraction of the word unit are stored therein, the computer system packs the data into whole word units before writing.

A bit field manipulation circuit, such as that described in Patent Literature 1 and in Patent Literature 2. is an example of a device providing comparatively effective data packing to a computer system.

The bit field manipulation circuit described in Patent Literature 1 (hereinafter, bit field manipulation circuit A) performs bit field manipulation as indicated in FIG. 21.

As shown, bit field manipulation circuit A performs bit field manipulation operations on data A 2000 and B 2001, which are N-bit sequences input thereto. Data C 2002 is an N-bit sequence output from bit field manipulation circuit A upon performing the bit field manipulation operations.

When instructions indicating data A 2000, data B 2001, an offset length 2010, and a width 2011 are input thereto, the bit field manipulation circuit A performs bit field manipulation operations so as to generate data C 2002 by inserting a bit sequence that includes the least-significant bit of data B 2001 and is of width 2011 at a position within data A 2000 shifted leftward by the offset length 2010 from the least-significant bit position.

The bit field manipulation circuit described in Patent Literature 2 (hereinafter, bit field manipulation circuit B) performs bit field manipulation as indicated in FIG. 22.

As shown, bit field manipulation circuit B performs bit field manipulation operations on data A 2100 which is an N-bit sequence input thereto. Data B 2101 is an N-bit sequence output from bit field manipulation circuit B upon performing the bit field manipulation operations.

When instructions indicating data A 2100, an offset length 2110, and a shift length 2111 are input thereto, the bit field manipulation circuit B generates data B 2101 by inserting a bit sequence that includes the least-significant bit of data A 2100 and is of the length indicated by the offset length 2110 into the data A 2100 as logically shifted rightward by the shift length.

CITATION LIST

Patent Literature

Patent Literature 1

Japanese Patent Application Publication No. 2008-83795

Patent Literature 2

Japanese Patent Application Publication No. 2000-99327

SUMMARY OF INVENTION

Technical Problem

When packed data are read from the storage device for use, the data so read must first be unpacked.

As such, a computer system making use of data packing and unpacking beneficially performs data unpacking in a comparatively efficient manner, in addition to performing comparatively efficient data packing.

In consideration of the above, the present disclosure aims to provide a data processing device that executes comparatively efficient unpacking of packed data.

Solution to Problem

As a solution to the above-described problem, a data processing device comprises: a decoder operable to read an instruction for information specifying a bit sequence storage area in which an N-bit (N being an integer greater than or equal to two) target sequence is stored, information indicating a first bit range that includes a first end bit of a given N-bit sequence, and information indicating a second bit range that does not include a second end bit of the given N-bit sequence and that is contiguous with the first bit range, to decode the information so read, and to output a decoded signal in response to the information so read; and a bit manipulation circuit operable to, once the decoder outputs the decoded signal, generate and output an N-bit output sequence by manipulating the target sequence stored in the bit sequence storage area in accordance with the decoded signal, wherein the bit manipulation circuit generates the output sequence by arranging a bit sequence identical in value to the first bit range of the target sequence in the first bit range of the output sequence, arranging a bit sequence identical in value to the second bit range of the target sequence in a third bit range of the output sequence that is equal in length to the second bit range and that includes the second end bit of the output sequence, and filling a portion of the output sequence that belongs to neither of the first bit range and the third bit range with uniform bits of a predetermined value.

Advantageous Effects of Invention

In the data processing device configured as given above, the bit manipulation circuit operating in accordance with the signal decoded from one instruction unpacks data packed in the first and second bit regions of a data sequence stored in the bit sequence memory by inserting a bit sequence composed of uniform predetermined bits between the first and second bit regions, then outputs the result. Thus, the data processing device is able to perform unpacking of packed data in a comparatively efficient manner.

BRIEF DESCRIPTION OF DRAWINGS

FIG. 3 is a decoded signal correspondence table indicating the relationship between bit manipulation instructions and decoded signals.

FIG. 6 is a truth table used by a decoder 450.

FIG. 7 is a truth table used by a mask data generation circuit 350.

FIG. 17 is a decoded signal correspondence table indicating the relationship between SIMD bit manipulation instructions and decoded signals.

FIGS. 19A and 19B are schematic diagrams of instruction formats in mnemonic form.

DESCRIPTION OF EMBODIMENTS

Embodiment 1

The background leading to the development of a data processing device 100 is described below, prior to a more detailed description of the data processing device 100 as an Embodiment of the present disclosure.

Figure 23:
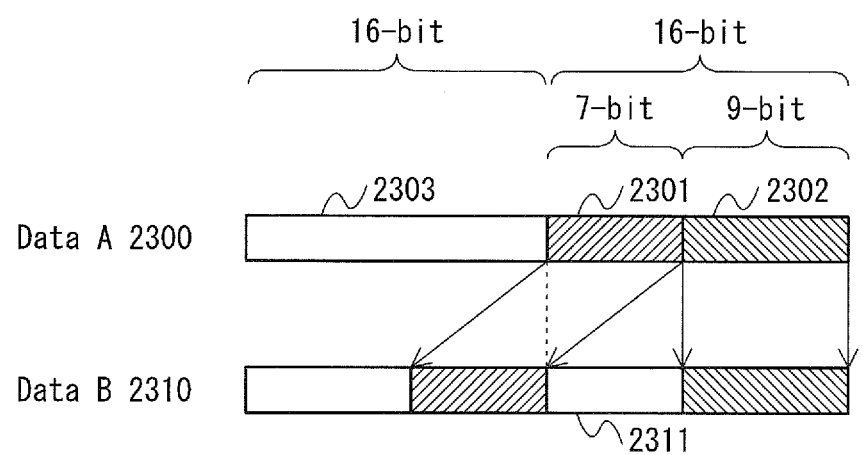
FIG. 23 is a data configuration diagram for a lower-bound unpacking operation.

FIG. 23 illustrates a specific example of a data structure before and after a lower-bound data unpacking process is performed, where lower-bound data unpacking serves as an example of data unpacking.

In this example, the lower-bound data unpacking process involves unpacking packed data such that each of a plurality of packed bit sequences are arranged by the least-significant bit in each bit sequence equivalent to a whole number of word units.

As shown in FIG. 23, data A 2300 are a sequence of 32 bits prior to application of the lower-bound data unpacking process. The data A 2300 are a sequence of 16 bits, which includes a 7-bit valid sequence 2301 and a 9-bit valid sequence 2302, and an unnecessary bit sequence 2303 that includes 16 bits of logical zeroes.

Similarly, data B 2310 are a sequence of 32 bits after application of the lower-bound data unpacking process. The lower-bound data unpacking process produces data B2310 by arranging the 7-bit valid sequence 2301 at the least-significant bit position of the first 16 bits and arranging the 9-bit valid sequence 2302 at the least-significant bit position of the last 16 bits.

When the last 16 bits of data B 2310 are treated as an integer for use in, for example, an arithmetic operation or the like performed using 16-bit units, a portion of a bit sequence 2311 (hereinafter, extended bit sequence 2311) is required to be made up of uniform predetermined values. In other words, the extended bit sequence 2311 must be equivalent to zero when treated as a non-signed integer, and must be equivalent to the value of the most-significant bit of the 9-bit valid sequence 2302 when treated as a signed integer.

However, the conventional bit field manipulation circuits A and B are unable to perform a type of lower-bound data unpacking process that satisfies the predetermined value (hereinafter, first data unpacking process) on the extended bit sequence 2311 with a single instruction. Thus, in a conventional data processing device, at least two instructions must be issued in order to execute the first data unpacking process.

Figure 24:
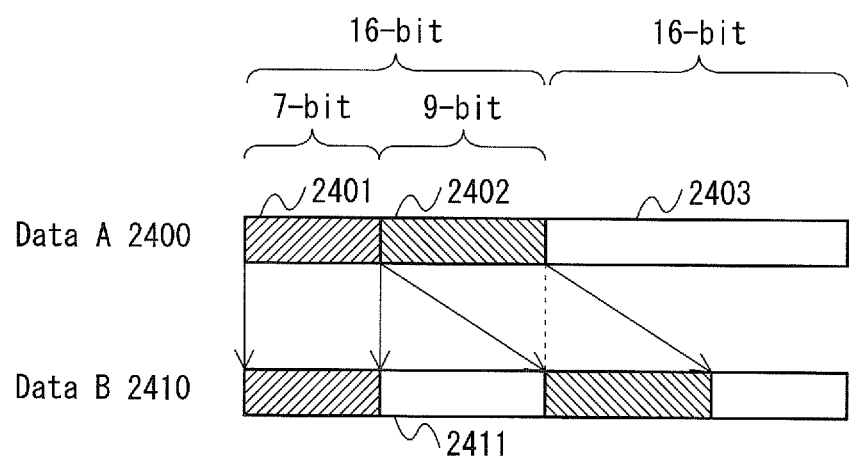
FIG. 24 is a data configuration diagram for an upper-bound unpacking operation.

FIG. 24 illustrates a specific example of a data structure before and after an upper-bound data unpacking process is performed, where upper-bound data unpacking serves as an example of unpacking data.

In this example, the upper-bound data unpacking process involves unpacking packed data such that each of a plurality of packed bit columns are arranged by the most-significant bit in each bit column numbering an integer multiple of a word unit.

As shown in FIG. 24, data A 2400 is a sequence of 32 bits prior to application of the upper-bound data unpacking process. The data A 2300 are made up of a sequence of 16 bits, which includes a 7-bit valid sequence 2401 and a 9-bit valid sequence 2402, and an unnecessary bit sequence 2403 that includes 16 bits of logical zeroes.

Similarly, data B 2410 are a sequence of 32 bits after application of the upper-bound data unpacking process. The upper-bound data unpacking process produces the data B 2310 by arranging the 7-bit valid sequence 2401 at the most-significant bit position of the first 16 bits and arranging the 9-bit valid sequence 2402 at the most-significant bit position of the last 16 bits.

When the 16 bits of data B 2410, which include the valid bit sequences 2402 and 2401, are handled as an integer for use in, for example, an arithmetic operation or the like performed using 16-bit units, a portion of a bit sequence 2411 (hereinafter, extended bit sequence 2411) is required to satisfy a uniform predetermined value. In other words, the extended bit sequence 2411 must be equivalent to zero when treated as a non-signed integer, and must be equivalent to the value of the most-significant bit of the 9-bit valid sequence 2402 when treated as a signed integer.

However, conventional bit field manipulation circuits A and B are unable to perform a type of upper-bound data unpacking process that satisfies the predetermined value (hereinafter, second data unpacking process) on the extended bit sequence 2411 with a single instruction. Thus, in a conventional data processing device, at least two instructions are issued in order to execute the second data unpacking process.

In a typical computer system, a limited quantity of instructions are executable in a given unit of time. Accordingly, for a conventional data processing device, executing the above-described first and second data unpacking processes with a single instruction is preferable to requiring a combination of two or more instructions.

Thus, the data processing device has been developed with the aim of providing a data processing device capable of executing the above-described first and second data unpacking processes with a single instruction.

The data processing device 100 comprises an instruction decoder, a register file, and a bit manipulation circuit. The bit manipulation circuit performs operations, such as shifting, on data stored in the register file in accordance with a decoded signal output by the instruction decoder.

The following describes the details of the data processing device 100, with reference to the accompanying drawings.

(Data Processing Device 100 Configuration)

Figure 1:
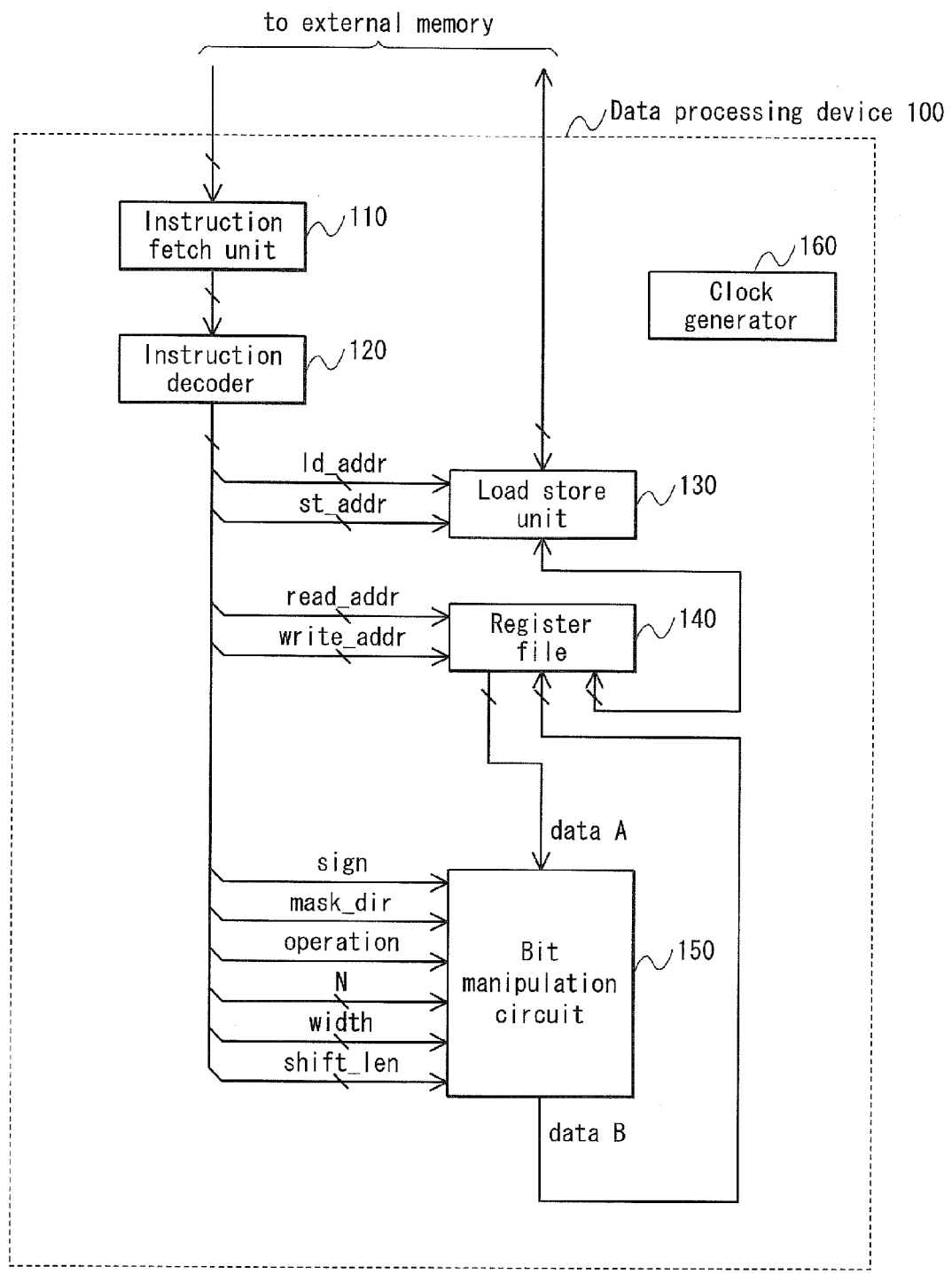
FIG. 1 is a block diagram illustrating the principal hardware configuration of a data processing device 100.

FIG. 1 is a block diagram illustrating the principal hardware configuration of the data processing device 100.

The data processing device 100 is, for example, a semiconductor integrated circuit, and includes an instruction fetch unit 110, an instruction decoder 120, a load store unit 130, a register file 140, a bit manipulation circuit 150, and a clock generator 160.

The clock generator 160 generates a clock signal at, for example, 100 MHz, and outputs the clock signal to the instruction fetch unit 110, the instruction decoder 120, the load store unit 130, the register file 140, and the bit manipulation circuit 150.

The instruction fetch unit 110 is connected to the instruction decoder 120 and to an external memory, and has the following two functions.

Function 1: To synchronize with the clock signal provided by the clock generator 160, read a 4-byte instruction stored in the external memory, and output the instruction so read to the instruction decoder 120.

Function 2: To increment the address used in reading the instruction from the external memory by four bytes with respect to an address used to read a previous instruction from the external memory.

Figure 2:
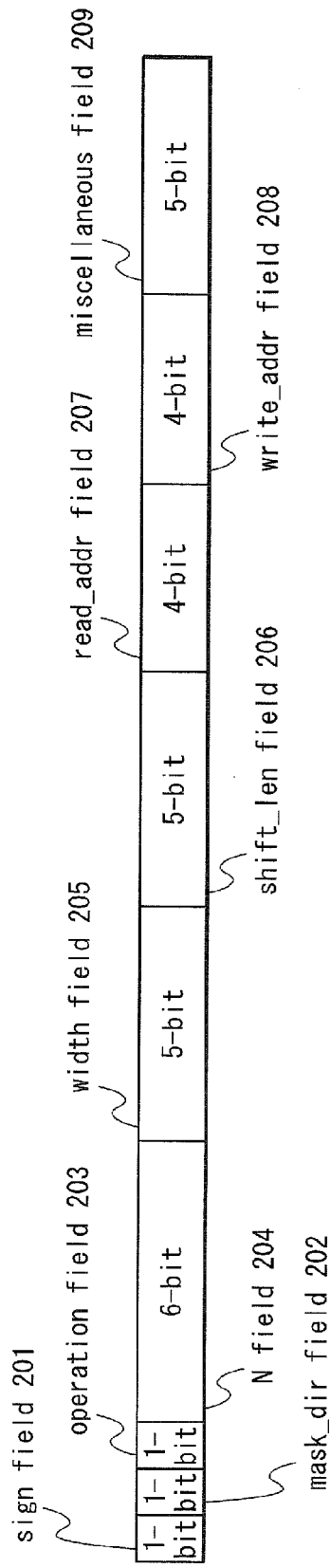
FIG. 2 is a bit field configuration diagram for a 4-byte instruction.

FIG. 2 is a bit field configuration diagram for a 4-byte instruction stored in the external memory.

As shown, the 4-byte instruction stored in the external memory is made up of a 1-bit signal field 201, a 1-bit mask_dir field 202, a 1-bit operation field 203, a 6-bit N field 204, a 5-bit width field 205, a 5-bit shift_len field 206, a 4-bit read_addr field 207, a 4-bit write_addr field 208, and a 5-bit miscellaneous field 209.

The explanation of the data processing device 100 continues below, with reference to FIG. 1.

The instruction decoder 120 is connected to the instruction fetch unit 110, the load store unit 130, the register file 140, and the bit manipulation circuit 150, and decodes an instruction written in a predetermined format input thereto by the instruction fetch unit 110, in accordance with a predetermined algorithm.

The instruction decoded by the instruction decoder 120 is one of two types, namely a load store instruction pertaining to a load store operation performed using the load store unit 130 and the register file 140, and bit manipulation instruction pertaining to a bit manipulation operation performed using the register file 140 and the bit manipulation circuit 150.

The decoding of the bit manipulation instruction performed by the instruction decoder 120 is described below, with reference to the drawings.

FIG. 3 presents a decoded signal correspondence table 200 indicating the correspondence between the bit manipulation instruction to be decoded by the instruction decoder 120 and the decoded signal.

As shown, an instruction format column 210 indicates the instruction format for each bit manipulation instruction to be decoded, in mnemonic form.

The bit manipulation instruction has one of six types of operation code (hereinafter, opcode). These are: a shrnhN instruction using a shrnhN (where N is one of 8, 16, and 32; this applies throughout) opcode, a shrnlN instruction using a shrnlN opcode, a shrnlsN instruction using a shrnlsN opcode, an extrhN instruction using an extrhN opcode, an extrlN instruction using an extrlN opcode, and an extrlsN instruction using an extrlsN opcode.

Each instruction has an operand including a register name B designating a destination register in the register file 140, a register name A designating a source register in the register file 140, a shift_len field indicating a first bit-length that is less than N bits, and a width field indicating a second bit-length that is less than N bits.

The sign column 220, the mask_dir column 230, the operation column 240, the N column 250, the width column 260, the shift_len column 270, the read_addr column 280, and the write_addr column 290 respectively indicate the decoded signal output when the instruction decoder 120 decodes each such bit manipulation instruction.

The sign column 220 lists a logical value of one when the sixth character of the opcode is an s, and a logical value of zero when the sixth character of the opcode is anything other than an s. The logical value is a signal output to the bit manipulation circuit 150. The sign column 220 thus lists a signal indicating whether the bit manipulation operation to be performed by the bit manipulation circuit 150 is a sign extension process associated with sign extension or a zero extension process not associated with sign extension.

Further, the sign column 220 is decoded as the sign field 201 given in FIG. 2.

The mask_dir column 230 lists a logical value of zero when the fifth character of the opcode is an h, and lists a logical value of one when the fifth character of the opcode is not an h, i.e., when the character is an l. The logical value is a signal output to the bit manipulation circuit 150. The mask_dir column 230 thus lists a signal specifying a bit sequence that remains unshifted in the bit manipulation operation to be performed by the bit manipulation circuit 150. The bit sequence that remains unshifted is described later.

Further, the mask_dir column 230 is decoded as the mask_dir field 202 given in FIG. 2.

The operation column 240 lists a logical value of zero when the first four characters of the opcode are shrn, and lists a logical value of one when the first four characters of the opcode are not shrn, i.e., when the characters are ext. The logical value is a signal output to the bit manipulation circuit 150. The operation column 240 thus lists a signal specifying a shift direction for a bit sequence shifted in the bit manipulation operation to be performed by the bit manipulation circuit 150, relative to the bit sequence that remains unshifted. The bit sequence that is shifted is described later.

Further, the operation column 240 is decoded as the operation field 203 given in FIG. 2.

The N column 250 is a 6-bit signal indicating a binary number N included in the opcode, and is output to the bit manipulation circuit 150. The N column 250 thus lists a signal indicating the length of the bit sequence operated on in the bit manipulation operation performed by the bit manipulation circuit 150.

Further, the N column 250 is decoded as the N field 204 given in FIG. 2.

The width column 260 is a 5-bit signal indicating a binary value of the operand width field, and is output to the bit manipulation circuit 150. The width column 260 thus lists a signal indicating the length of the bit sequence shifted in the bit manipulation operation performed by the bit manipulation circuit 150.

Further, the width column 260 is decoded as the width field 205 given in FIG. 2.

The shift_len column 270 is a 5-bit signal indicating a binary value of the operand shift_len field, and is output to the bit manipulation circuit 150. The shift_len column 270 thus lists a signal indicating the amount by which the bit sequence is shifted in the bit manipulation operation performed by the bit manipulation circuit 150.

Further, the shift_len column 270 is decoded as the shift_len field 206 given in FIG. 2.

The read_addr column 280 is a 4-bit signal indicating an address (addrA) in the source register within the register file 140, as designated by the operand A, and is output to the register file 140. Further, the read_addr column 280 is decoded as the read_addr field 207 given in FIG. 2.

The write_addr column 290 is a 4-bit signal indicating an address (addrB) in the source register within the register file 140, as designated by the operand B, and is output to the register file 140. Further, the write_addr column 290 is decoded as the write_addr field 208 given in FIG. 2.

The explanation of the data processing device 100 continues below, with reference to FIG. 1.

The load store unit 130 is connected to the instruction decoder 120, the register file 140, and the external memory, and has the following two functions.

Function 1: Upon input of an ld_addr signal, output from the instruction decoder 120 decoding the load store instruction, that indicates an address in the external memory, to synchronize with the clock signal supplied by the clock generator 160, read four bytes of data from the area of the external memory designated as the address by the ld_addr signal, and output the data to the register file 140.

Function 2: Upon input of an st_addr signal, output from the instruction decoder 120 decoding the load store instruction, that indicates an address in the external memory, to synchronise with the clock signal supplied by the clock generator 160, and write the four bytes of data input by the register file 140 to the external memory address specified by the st_addr signal.

The register file 140 is connected to the instruction decoder 120, the load store unit 130, and the bit manipulation circuit 150, has sixteen general-purpose registers each storing four bytes, and has the following two functions.

Function 1: Upon input of a read_addr signal from the instruction decoder 120, to synchronise with the clock signal supplied by the clock generator 160, and to output the four bytes of data stored in the source register designated by the read_addr signal.

Function 2: Upon input of a write_addr signal from the instruction decoder 120, to synchronise with the clock signal supplied by the clock generator 160, and to store four bytes of data output during the same clock cycle by the load store unit 130 or the bit manipulation circuit 150 in the destination register designate by the write_addr signal.

The bit manipulation circuit 150 is connected to the instruction decoder 120 and the register file 140, performs an operation on the data A input by the register file 140 in accordance with the decoded signal input from the instruction decoder 120, and generates data B for output.

Figure 4:
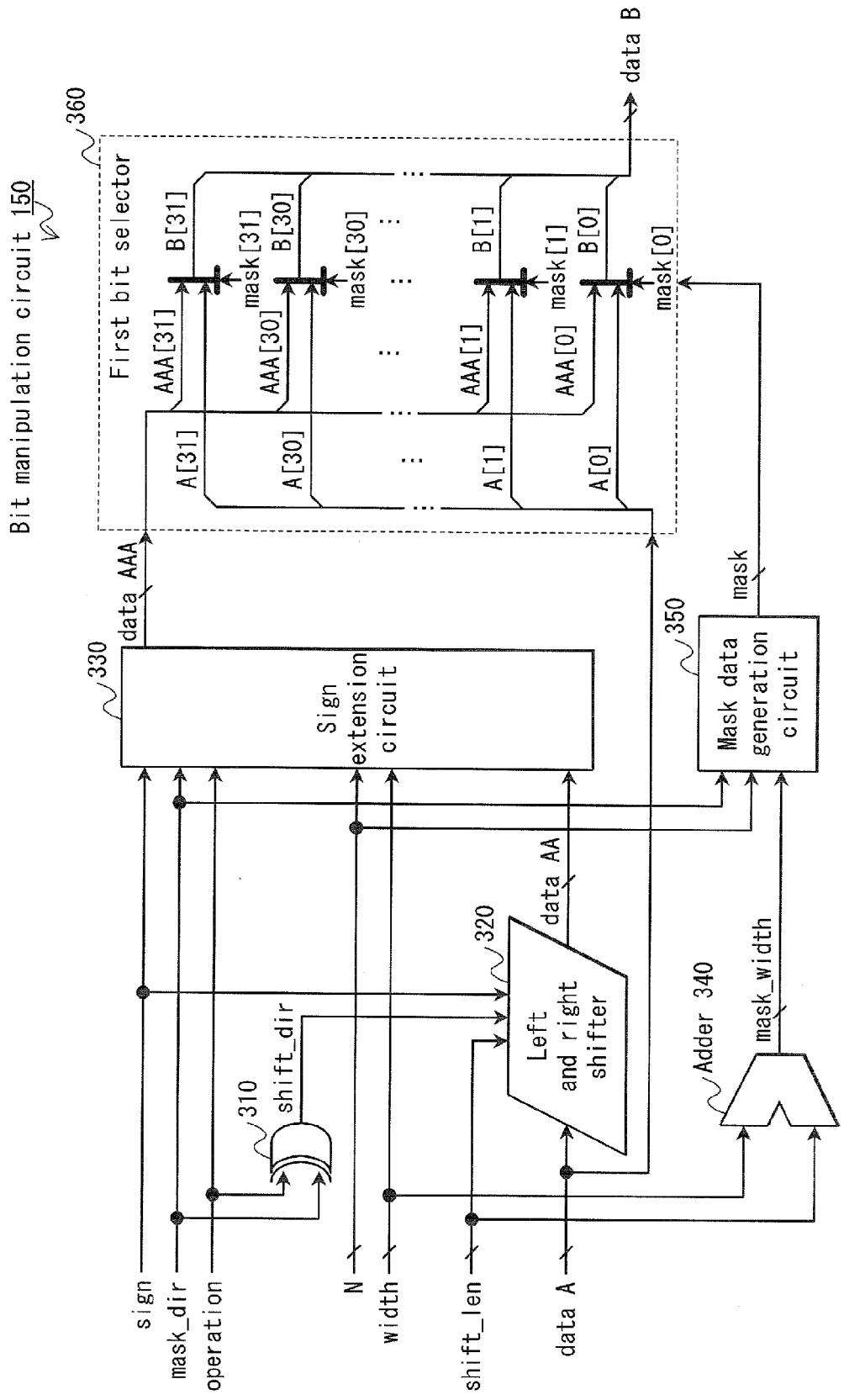
FIG. 4 is a circuit configuration diagram of a bit manipulation circuit 150.

FIG. 4 is a circuit configuration diagram of the bit manipulation circuit 150.

As shown, the bit manipulation circuit 150 includes an exclusive OR gate 310, a left and right shifter 320, a sign extension circuit 330, an adder 340, a mask data generation circuit 350, and a first bit selector 360.

The exclusive OR gate 310 is a two-input exclusive OR circuit connected to a signal line for a decoded mask_dir signal, a signal line for a decoded operation signal, and the left and right shifter 320.

Upon input of the decoded mask_dir and operation signals, the exclusive OR gate 310 outputs a 1-bit shift_dir signal indicating the shift direction to the left and right shifter 320.

The left and right shifter 320 is a left and right barrel shifter connected to a signal line for the decoded sign signal, a signal line for a decoded shift_len signal, the exclusive OR gate 310, a signal line for input data A, and the sign extension circuit 330. The left and right shifter 320 shifts input data A in accordance with the control signals sign, shift_len, and shift_dir, and outputs data AA.

The following describes each of the control signals.

shift_dir: A control signal specifying whether the shift direction is rightward (toward less-significant bits) or leftward (toward more-significant bits). The left and right shifter 320 performs a rightward shift when the logical value of the shift_dir signal is one, and performs a leftward shift when the logical value of the shift_dir signal is zero.

shift_len: A control signal indicating the shift length. The left and right shifter 320 performs a rightward or leftward shift of the length indicated by the shift_len signal.

sign: A control signal indicating whether or not a rightward shift is associated with sign extension, i.e., is an arithmetic shift, or a logical shift. The left and right shifter 320 performs a rightward shift associated with sign extension when the logical value of the sign signal is one, and performs a rightward shift not associated with sign extension when the logical value of the sign signal is zero.

The sign extension circuit 330 is connected to the signal line for the decoded sign signal, the signal line for the decoded mask_dir signal, the signal line for the decoded operation signal, a signal line for a decoded N signal, a signal line for a decoded width signal, the left and right shifter 320, and the first bit selector 360. The sign extension 330 inserts a copy of the signal or a logical value of zero at a predetermined bit position of the input data AA, in accordance with the sign, mask_dir, operation, N, and width control signals, then outputs output data AAA.

Figure 5:
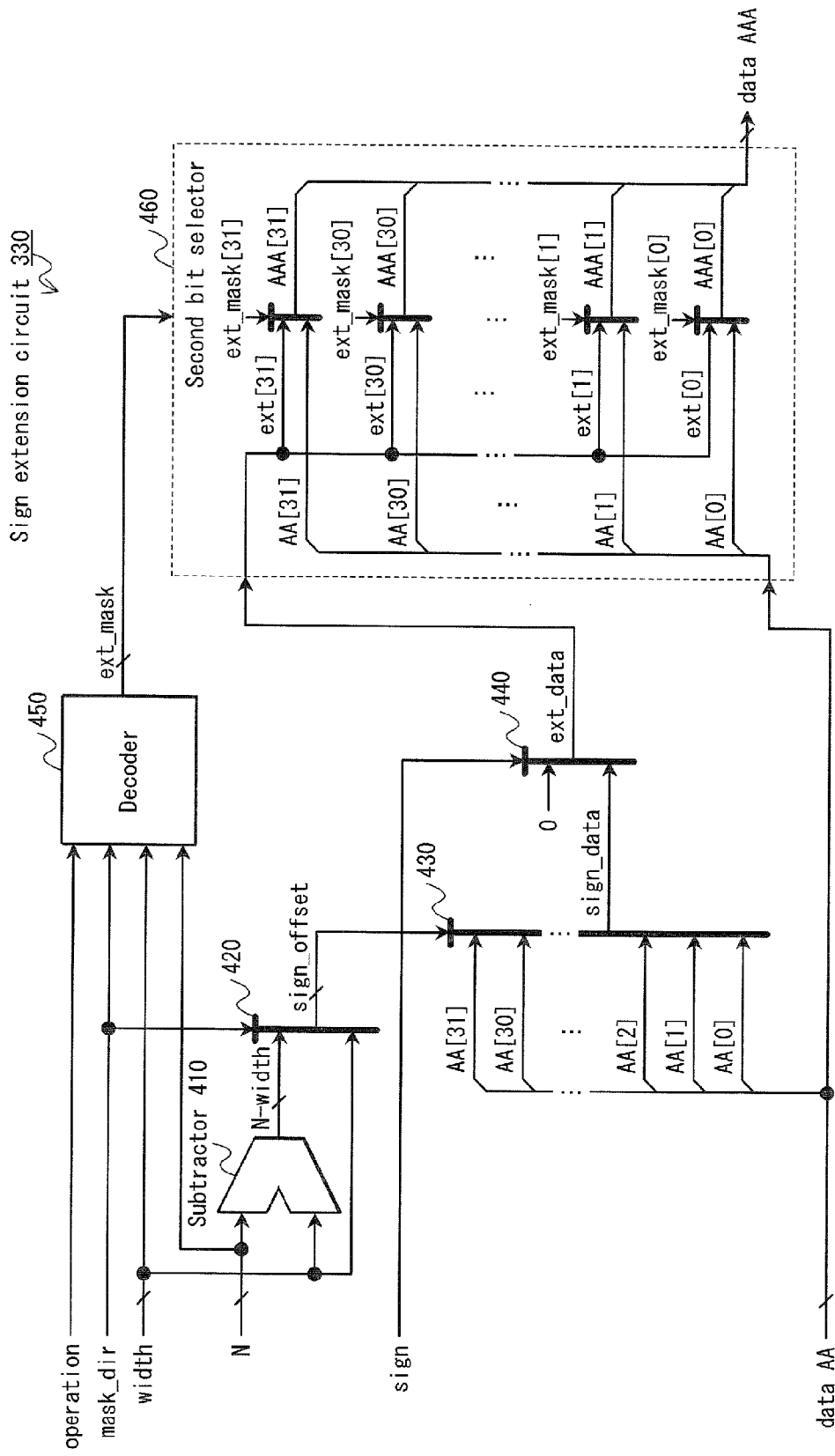
FIG. 5 is a circuit configuration diagram of a sign extension circuit 330.

FIG. 5 is a circuit configuration diagram of the sign extension circuit 330.

As shown, the sign extension circuit 330 includes a subtractor 410, a first selector 420, a second selector 430, a third selector 440, a decoder 450, and a second bit selector 460.

The subtractor 410 is connected to the signal line for the decoded width signal, the signal line for the decoded N signal, and the first selector 420, subtracts the N value from the width value, and outputs a 6-bit signal of length N-width.

The first selector 420 is a 6-bit dual-input single-output selector connected to the signal line for the decoded mask_dir signal, the signal line for the decoded width signal, and the subtractor 410 that selects the width value when the logical value of the mask_dir control signal is one and selects the value of N-width when the logical value of the mask_dir control signal is zero, then outputs a 6-bit sign_offset signal. The sign_offset signal is an N-bit sequence subject to a bit manipulation operation, indicating the aforementioned predetermined bit position.

The second selector 430 is a 32-input single-output selector connected to a signal line for input data AA, the first selector 420, and the third selector 440, that selects the bit position indicated by the sign_offset signal from the 32-bit sequence of input data AAA, then outputs a 1-bit sign_data signal.

The third selector 440 is a 1-bit dual-input single output selector connected to the signal line for the decoded sign signal, the second selector 430, and the second bit selector 460, that selects the sign_data signal when the logical value of the sign control signal is one and selects a logical value of zero when the logical value of the sign control signal is zero, then outputs a 1-bit ext_data signal.

The decoder 450 is connected to the signal line for the decoded operation signal, the signal line for the decoded mask_dir signal, the signal line for the decoded width signal, the signal line for the decoded N signal, and the second bit selector 460, and decodes the operation, mask_dir, width, and N control signals into a 32-bit ext_mask signal.

FIG. 6 gives a truth table used by the decoder 450.

As shown, the operation column 510, the mask_dir column 520, and the width column 530 list the signals input to the decoder 450. The ext_mask (N-bit) column 540 lists the last N bits of a 32-bit decoded ext_mask signal. The ext_mask signal is made up of 32 bits, in which all but the last N bits are don't care terms (not diagrammed).

Once the operation, mask_dir, width, and N signals are input thereto, the decoder 450 outputs the ext_mask in accordance with the truth table given in FIG. 6.

The description of the sign extension 330 resumes below with reference to FIG. 5.

The second bit selector 460 is made up of 32 dual-input single-output selectors, is connected to the signal line for the input data AA, the third selector 440, the decoder 450, and the first bit selector 360 (see FIG. 4), and inserts the ext_data bits into the data AA at the bit position designated by the ext_mask signal, thus generating data AAA.

Each of the selectors in the second bit selector 460 takes the bits of the ext_mask signal as a control signals to select and output one of the ext_data signal and a corresponding bit of data AA.

The description of the bit manipulation circuit 150 continues below with reference to FIG. 4.

The adder 340 is connected to the signal line for the decoded width signal, the signal line for the decoded shift_len signal, and the mask data generation circuit 350, adds the values of the width signal and the shift_len signal, and outputs a 6-bit mask_width signal.

The mask data generation circuit 350 is a decoder connected to the signal line for the decoded mask_dir signal, the signal line for the decoded N signal, the adder 340 and the first bit selector 360, that takes the mask_dir, N, and mask_width signals as input and decodes a 32-bit mask signal.

FIG. 7 gives a truth table used by the mask_data generation circuit 350.

As shown, the mask_dir column 610 and the mask_width column 620 list signals input to the mask data generation circuit 350. The mask (N-bit) column 630 lists the last N bits of a 32-bit decoded mask signal. The mask signal is made up of 32 bits, in which all but the last N bits are don't care terms (not diagrammed).

Upon input of the mask_dir, mask_width, and N signals, the mask data generation circuit 350 outputs a mask signal in accordance with the truth table given in FIG. 7.

The description of the bit manipulation circuit 150 continues below with reference to FIG. 4.

The first bit selector 360 is made up of 32 dual-input single output selectors, is connected to the signal line for the input data A, the sign extension circuit 330, the mask data generation circuit 350, and a signal line for output data B, inserts data AAA into data A at the bit position indicated by the mask signal, and generates data B.

Each of the selectors in the first bit selector 360 takes the bits of the mask signal as a control signal to select and output one of a corresponding bit of data A and a corresponding bit of data AAA.

The operations of the bit manipulation circuit 150 in the above-described data processing device 100 are explained below, in circumstances where the instruction decoder 120 has decoded the bit manipulation instruction.

(Bit Manipulation Circuit 150 Operations)

Figure 8:
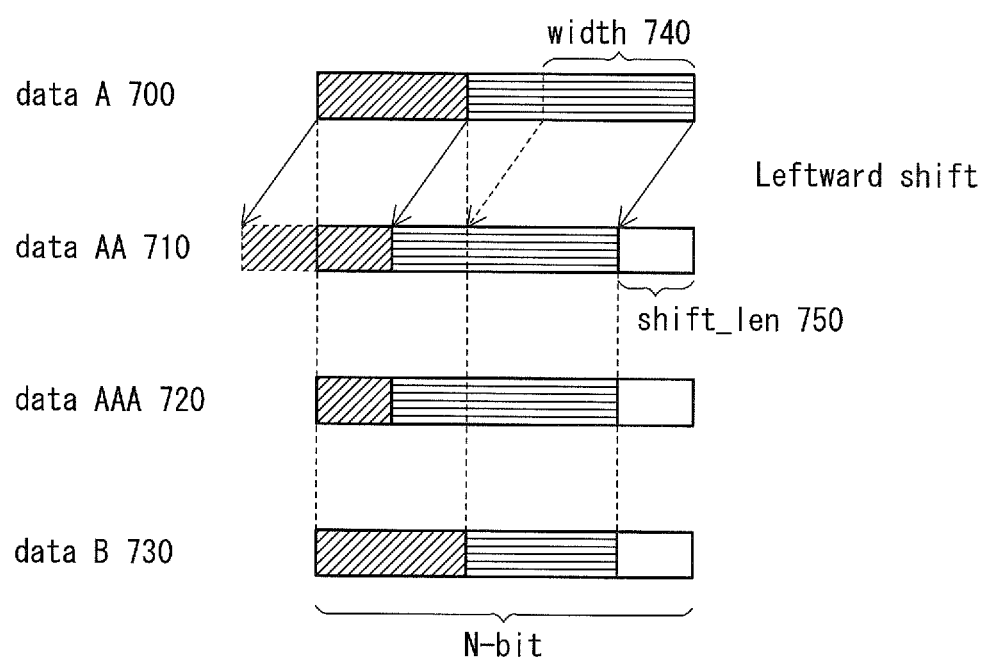
FIG. 8 is a data configuration diagram of an shrnhN instruction being decoded.

FIG. 8 is a data structure diagram indicating the structure of the data used and generated by the bit manipulation circuit 150 when the instruction decoder 120 decodes a shrnhN instruction.

As shown, the data A 700 are a sequence of bits made up of the last N bits of the 32-bit input data output from the register file 140 during the same clock cycle as the decoded signal output from the instruction decoder 120. The data AA 710 are a sequence of bits made up of the last N bits of the 32-bit data AA output from the left and right shifter 320, and correspond to the data A input from the register file 140. The data AAA 720 are a sequence of bits made up of the last N bits of the 32-bit data AAA output from the sign extension circuit 330, and correspond to the data AA input from the left and right shifter 320. The data B 730 are a sequence of bits made up of the last N bits of the 32-bit data B output from the first bit selector 360, and correspond to the data AAA output from the sign extension circuit 330. The width 740 is the length of bits designated by the decoded width signal input from the instruction decoder 120. The shift_len 750 is the shift length designated by the decoded shift_len signal input from the instruction decoder 120.

Upon input, from the instruction decoder 120, of the decoded signals corresponding to the shrnhN instruction, the exclusive OR gate 310 (see FIG. 4) outputs a shift_dir signal having a logical value of zero to the left and right shifter 320. The left and right shifter 320 then shifts the data A 700 leftward by the length indicated in the shift_len 750, and outputs the data AA 710.

Similarly, upon input, from the instruction decoder 120, of the decoded signals corresponding to the shrnhN instruction, the decoder 450 (see FIG. 5) outputs an ext_mask signal, in which the last N bits each have a logical value of zero, to the second bit selector 460. The second bit selector 460 then outputs the data AA 710 as-is, as the data AAA 720.

The adder 340 (see FIG. 4) adds the values of the width signal 740 and the shift_len signal 750, and outputs the mask_width signal. The mask data generation circuit 350 then outputs a mask signal to the first bit selector 360 in which the last N bits are such that a bit sequence that includes the least-significant bit indicated by the mask_width signal has a logical value of one, and all other bits have a logical value of zero.

Accordingly, the first bit selector 360 selects a bit sequence that includes the least-significant bit in a sequence of bits having a width equivalent to the sum of the width signal 740 and the shift_len signal 750 from the data AAA 720, selects all other data from the data A 700, and outputs the whole as the data B 730.

Thus, when the instruction decoder 120 has decoded the shrnhN instruction, the bit manipulation circuit 150 shifts a bit sequence of the width indicated by the width signal 740 that includes the least-significant bit of the data A 700 leftward by the length indicated by the shift_len signal 750. Another bit sequence of the width given by N−(width 740+ shift_len 750) that includes the most-significant bit of the data A 700 remains unshifted. Thus, the data B 730 are generated and output.

Figure 9:
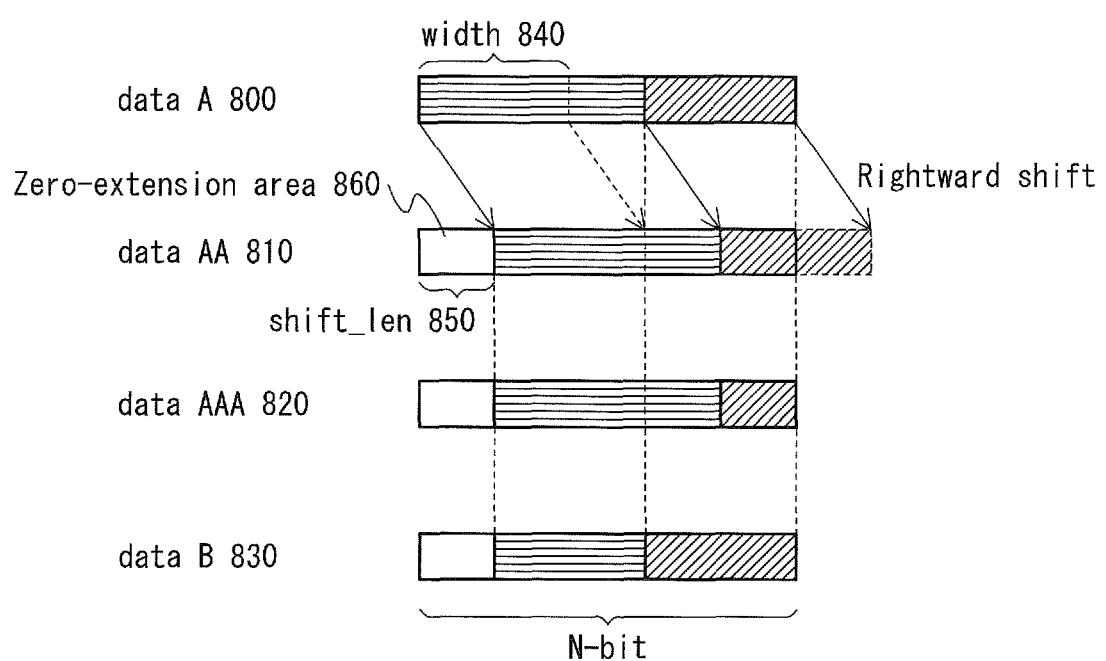
FIG. 9 is a data configuration diagram of an shrnlN instruction being decoded.

FIG. 9 is a data structure diagram indicating the structure of the data used and generated by the bit manipulation circuit 150 when the instruction decoder 120 decodes a shrnlN instruction.

As shown, the data A 800, the data AA 810, the data AAA 820, the data B 830, the width signal 840, and the shift_len signal 850 respectively correspond to the data A 700, the data AA 710, the data AAA 720, the data B 730, the width signal 740, and the shift_len signal 750 of FIG. 8. Accordingly, the explanations thereof are omitted.

Upon input, from the instruction decoder 120, of the decoded signals corresponding to the shrnlN instruction, the exclusive OR gate 310 outputs a shift_dir signal having a logical value of one to the left and right shifter 320. The left and right shifter 320 then shifts the data A 800 rightward by the length indicated in the shift_len 850, such that the shift does not involve sign extension, and outputs the data AA 810. Given that the shift performed by the left and right shifter 320 does not involve sign extension, a zero-extension area 860 having a logical value of zero is inserted, as shown in FIG. 9.

Similarly, upon input, from the instruction decoder 120, of the decoded signals corresponding to the shrnlN instruction, the decoder 450 outputs an ext_mask signal in which the last N bits each have a logical value of zero to the second bit selector 460. The second bit selector 460 then outputs the data AA 810 as-is, as the data AAA 820.

The adder 340 adds the values of the width signal 840 and the shift_len signal 850, and outputs the mask_width signal. The mask data generation circuit 350 then outputs a mask signal to the first bit selector 360 in which the last N bits are such that a bit sequence that includes the least-significant bit indicated by the value of N−(width 840+shift_len 850) has a logical value of one, and all other bits have a logical value of zero.

Accordingly, the first bit selector 360 selects a bit sequence that includes the most-significant bit in a bit sequence of a width equivalent to the sum of the width signal 840 and the shift_len signal 850 from the data AAA 820, selects all other data from the data A 800, and outputs the whole as the data B 830.

Thus, when the instruction decoder 120 has decoded the shrnlN instruction, the bit manipulation circuit 150 shifts a bit sequence of the width indicated by the width signal 840 and that includes the most-significant bit of the data A 800 rightward by the length indicated by the shift_len signal 850, such that the shift does not involve sign extension. Another bit sequence of the width given by N−(width 840+shift_len 850) that includes the least-significant bit of the data A 800 remains unshifted. Thus, the data B 830 are generated.

Figure 10:
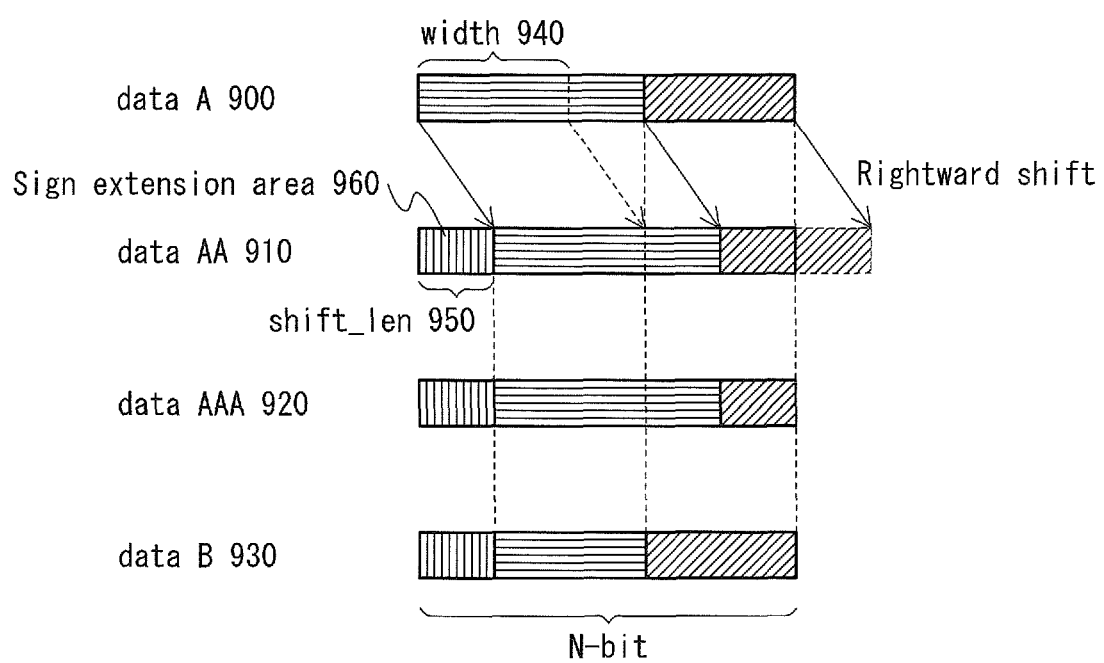
FIG. 10 is a data configuration diagram of an shrnlsN instruction being decoded.

FIG. 10 is a data structure diagram indicating the structure of the data used and generated by the bit manipulation circuit 150 when the instruction decoder 120 decodes a shrnlsN instruction.

As shown, the data A 900, the data AA 910, the data AAA 920, the data B 930, the width signal 940, and the shift_len signal 950 respectively correspond to the data A 700, the data AA 710, the data AAA 720, the data B 730, the width signal 740, and the shift_len signal 750 of FIG. 8. Accordingly, the explanations thereof are omitted.

Upon input, from the instruction decoder 120, of the decoded signals corresponding to the shrnlsN instruction, the exclusive OR gate 310 outputs a shift_dir signal having a logical value of one to the left and right shifter 320. The left and right shifter 320 then shifts the data A 800 rightward by the length indicated in the shift_len signal 850, such that the shift involves sign extension, and outputs the data AA 810. Given that the shift performed by the left and right shifter 320 involves sign extension, a sign extension region 960 is used such that the most-significant bit of the data A 900 becomes a sign extension, as shown in FIG. 10.

Similarly, upon input, from the instruction decoder 120, of the decoded signals corresponding to the shrnlsN instruction, the decoder 450 outputs an ext_mask signal in which the last N bits each have a logical value of zero to the second bit selector 460. The second bit selector 460 then outputs the data AA 910 as-is, as the data AAA 920.

The adder 340 adds the values of the width signal 940 and the shift_len signal 950 and outputs the mask_width signal. The mask data generation circuit 350 then outputs a mask signal to the first bit selector 360 in which the last N bits are such that a bit sequence that includes the least-significant bit indicated by the value of N−(width 940+shift_len 950) has a logical value of one, and all other bits have a logical value of zero.

Accordingly, the first bit selector 360 selects a bit sequence that includes the most-significant bit in a bit sequence of a width equivalent to the sum of the width signal 940 and the shift_len signal 950 from the data AAA 920, selects all other data from the data A 900, and outputs the whole as the data B 930.

Thus, when the instruction decoder 120 has decoded the shrnlsN instruction, the bit manipulation circuit 150 shifts a bit sequence of the width indicated by the width signal 940 that includes the most-significant bit of the data A 900 rightward by the length indicated by the shift_len signal 950, such that the shift involves sign extension. Another bit sequence of the width given by N−(width 940+shift_len 950) and that includes the least-significant bit of the data A 800 remains unshifted. Thus, the data B 830 are generated.

Figure 11:
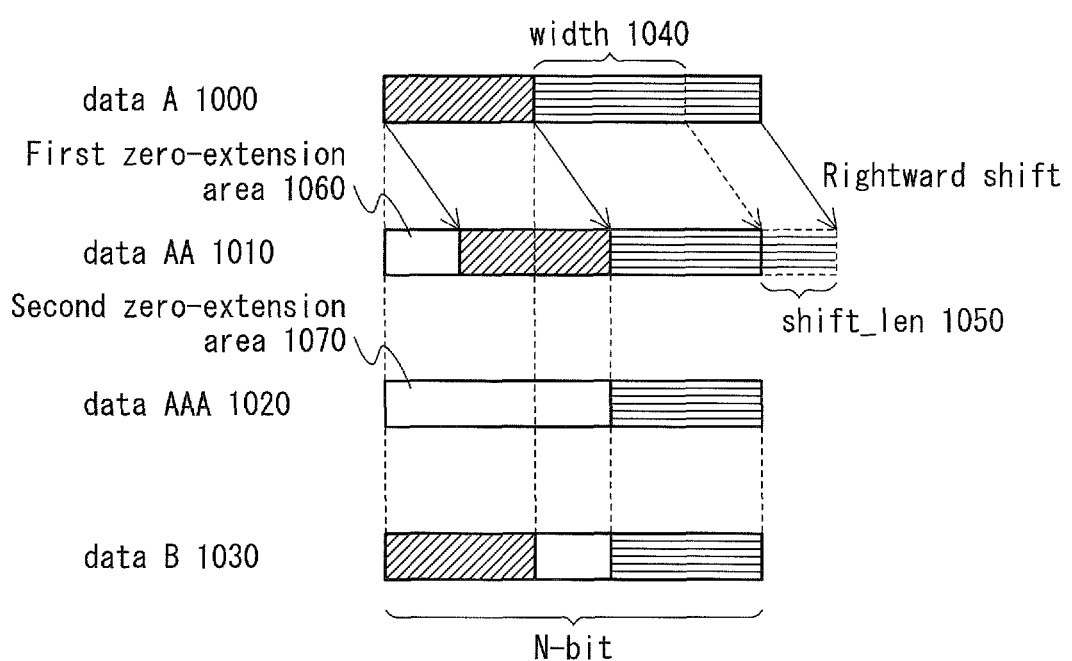
FIG. 11 is a data configuration diagram of an extrhN instruction being decoded.

FIG. 11 is a data structure diagram indicating the structure of the data used and generated by the bit manipulation circuit 150 when the instruction decoder 120 decodes an extrhN instruction.

As shown, the data A 1000, the data AA 1010, the data AAA 1020, the data B 1030, the width signal 1040, and the shift_len signal 1050 respectively correspond to the data A 700, the data AA 710, the data AAA 720, the data B 730, the width signal 740, and the shift_len signal 750 of FIG. 8. Accordingly, the explanations thereof are omitted.

Upon input, from the instruction decoder 120, of the decoded signals corresponding to the extrhN instruction, the exclusive OR gate 310 outputs a shift_dir signal having a logical value of one to the left and right shifter 320. The left and right shifter 320 then shifts the data A 1000 rightward by the length indicated in the shift_len signal 1050, such that the shift does not involve sign extension, and outputs the data AA 1010. Given that the shift performed by the left and right shifter 320 does not involve sign extension, a first zero-extension area 1060 having a logical value of zero is inserted, as shown in FIG. 11.

Also, given that the sign signal input from the instruction decoder 120 has a logical value of zero, the third selector 440 outputs a logical value of zero as the ext_data. Then, upon input, from the instruction decoder 120, of the decoded signals corresponding to the extrhN instruction, the decoder 450 outputs an ext_mask signal in which the last N bits of a bit sequence of a width indicated by the width 1040 and including the least-significant bit has a logical value of one, and all other bits have a logical value of zero. The second bit selector 460 then selects a bit sequence from the data AA 1010 of a width indicated by the width 1040 and including the least-significant bit, selects a logical value of zero for all other bits, and thus generates the data AAA 1020 for output. Accordingly, the second zero-extension area 1070 of FIG. 11 has a logical value of zero.

The adder 340 adds the values of the width signal 1040 and the shift_len signal 1050 and outputs the mask_width signal. The mask data generation circuit 350 then outputs a mask signal to the first bit selector 360 in which the last N bits are such that a bit sequence that includes the least-significant bit indicated by the value of N−(width 1040+shift_len 1050) has a logical value of one, and all other bits have a logical value of zero.

Accordingly, the first bit selector 360 selects a bit sequence that includes the least-significant bit in a bit sequence of a width equivalent to the sum of the width signal 1040 and the shift_len signal 1050 from the data AAA 1020, selects all other data from the data A 1000, and outputs the whole as the data B 1030.

Thus, when the instruction decoder 120 has decoded an extrhN instruction, the bit manipulation circuit 150 shifts a bit sequence that includes the least-significant bit from the data A 1000 and is of a width equivalent to width 1040+shift_len 1050 rightward by the length indicated by the shift_len signal 1050, such that the shift does not involve sign extension. A bit sequence that includes the most-significant bits and is of a width equivalent to N−(width 1040+shift_len 1050) remains unshifted. Thus the data B 1030 is generated for output.

Figure 12:
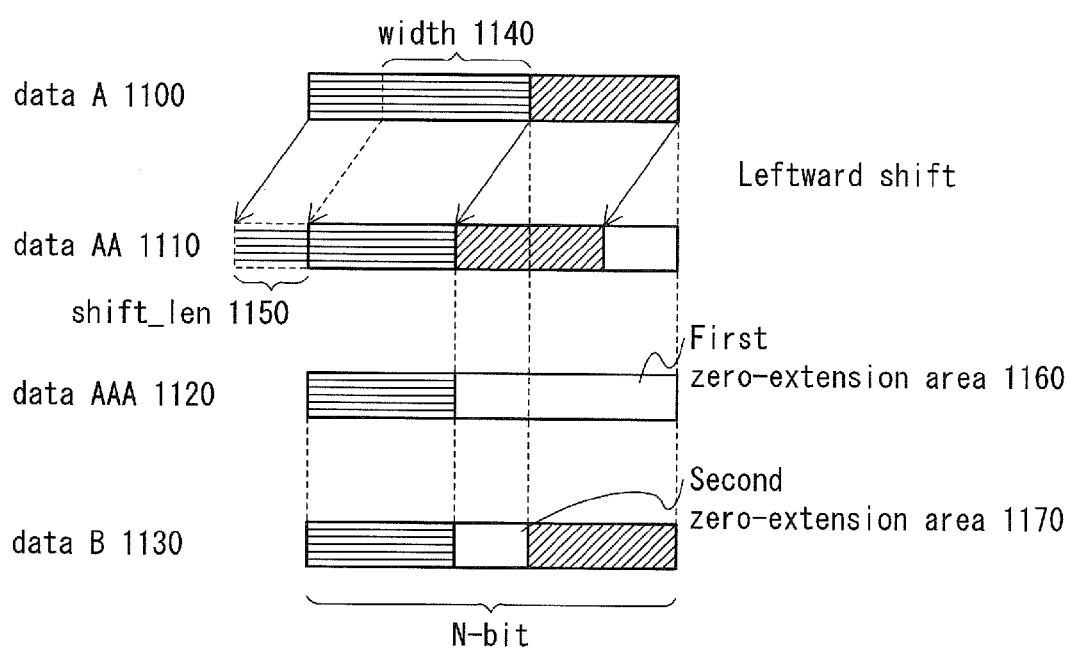
FIG. 12 is a data configuration diagram of an extrlN instruction being decoded.

FIG. 12 is a data structure diagram indicating the structure of the data used and generated by the bit manipulation circuit 150 when the instruction decoder 120 decodes an extrlN instruction.

As shown, the data A 1100, the data AA 1110, the data AAA 1120, the data B 1130, the width signal 1140, and the shift_len signal 1150 respectively correspond to the data A 700, the data AA 710, the data AAA 720, the data B 730, the width signal 740, and the shift_len signal 750 of FIG. 8. Accordingly, the explanations thereof are omitted.

Upon input, from the instruction decoder 120, of the decoded signals corresponding to the extrlN instruction, the exclusive OR gate 310 (see FIG. 4) outputs a shift_dir signal having a logical value of zero to the left and right shifter 320. The left and right shifter 320 then shifts the data A 1100 leftward by the length indicated in the shift_len signal 1150, and outputs the data AA 1110.

Also, given that the sign signal input from the instruction decoder 120 has a logical value of zero, the third selector 440 outputs a logical value of zero as the ext_data. Then, upon input, from the instruction decoder 120, of the decoded signals corresponding to the extrlN instruction, the decoder 450 outputs an ext_mask signal in which the last N bits of a bit sequence of a width indicated by the width signal 1040 and including the most-significant bit has a logical value of one, and all other bits have a logical value of zero. The second bit selector 460 then selects a bit sequence from the data AA 1110 of a width indicated by the width signal 1040 and including the most-significant bit, selects a logical value of zero for all other bits, and thus generates the data AAA 1020 for output. Accordingly, the first zero-extension area 1160 of FIG. 12 has a logical value of zero.

The adder 340 adds the values of the width signal 1140 and the shift_len signal 1150 and outputs the mask_width signal. The mask data generation circuit 350 then outputs a mask signal to the first bit selector 360 in which the last N bits are such that a bit sequence that includes the most-significant bit indicated by the value of width 840+shift_len 850 has a logical value of one, and all other bits have a logical value of zero.

Accordingly, the first bit selector 360 selects a bit sequence that includes the most-significant bit in a bit sequence of a width equivalent to the sum of the width signal 1140 and the shift_len signal 1150 from the data AAA 1120, selects all other data from the data A 1100, and outputs the whole as the data B 1130.

Thus, when the instruction decoder 120 has decoded the extrlN instruction, the bit manipulation circuit 150 shifts a bit sequence of the width indicated by width 1140+shift_len 1150 and that includes the most-significant bit of the data A 1100 leftward by the length indicated by the shift_len signal 1150. Another bit sequence of the width given by N−(width 140+shift_len 1150) and that includes the least-significant bit of the data A 1100 remains unshifted, and the bits corresponding to the second zero-extension area 1170 of FIG. 12 is given a logical value of zero. Thus, the data B 1130 are generated.

Figure 13:
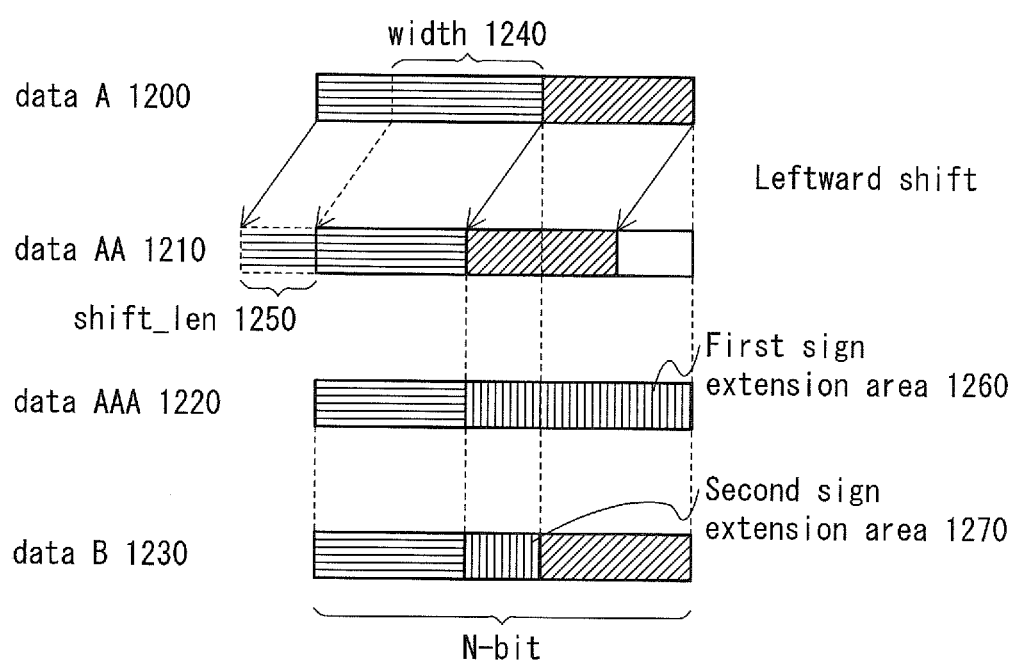
FIG. 13 is a data configuration diagram of an extrlsN instruction being decoded.

FIG. 13 is a data structure diagram indicating the structure of the data used and generated by the bit manipulation circuit 150 when the instruction decoder 120 decodes an extrlsN instruction.

As shown, the data A 1200, the data AA 1210, the data AAA 1220, the data B 1230, the width signal 1240, and the shift_len signal 1250 respectively correspond to the data A 700, the data AA 710, the data AAA 720, the data B 730, the width signal 740, and the shift_len signal 750 of FIG. 8. Accordingly, the explanations thereof are omitted.

Upon input, from the instruction decoder 120, of the decoded signals corresponding to the extrlN instruction, the exclusive OR gate 310 (see FIG. 4) outputs a shift_dir signal having a logical value of zero to the left and right shifter 320. The left and right shifter 320 then shifts the data A 1100 leftward by the length indicated in the shift_len signal 1150, and outputs the data AA 1110.

Given that the mask_dir signal output by the instruction decoder 120 has a logical value of one, the first selector 420 selects the N-width output by the subtractor 410 and outputs the sign_offset signal. Thus, the second selector 430 outputs a signal from the data AA 121 at the bit position given by N-width as the sign_data signal. Further, given that the sign signal input by the instruction decoder 120 has a logical value of one, the third selector 440 outputs the signal from the data AA 1210 at the bit position given by the N-width as the ext_data signal. Then, upon input, from the instruction decoder 120, of the decoded signals corresponding to the extrlsN instruction, the decoder 450 outputs an ext_mask signal in which the last N bits of a bit sequence of a width indicated by the width signal 1240 and including the most-significant bit has a logical value of one, and all other bits have a logical value of zero. The second bit selector 460 then selects a bit sequence from the data AA 1210 of a width indicated by the width 1240 and including the most-significant bit, selects the value of the signal at the N-width bit position for all other bits, and thus generates the data AAA 1020 for output. Thus, a first sign extension region 1260 from FIG. 13 has a logical value equivalent to that of the N-width bit position from the data AA 1210.

The adder 340 adds the values of the width signal 1240 and the shift_len signal 1250 and outputs the mask_width signal. The mask data generation circuit 350 then outputs a mask signal to the first bit selector 360 in which the last N bits are such that a bit sequence that includes the most-significant bit indicated by the value of width 1240+shift_len 1250 has a logical value of one, and all other bits have a logical value equivalent to that of the N-width bit position from the data AA 1210.

Accordingly, the first bit selector 360 selects a bit sequence that includes the most-significant bit in a bit sequence of a width equivalent to the sum of the width signal 1240 and the shift_len signal 1250 from the data AAA 1220, selects all other data from the data A 1200, and outputs the whole as the data B 1230.

Thus, when the instruction decoder 120 has decoded the extrlsN instruction, the bit manipulation circuit 150 shifts a bit sequence of the width indicated by width 1240+shift_len 2150 and that includes the most-significant bit of the data A 1200 leftward by the length indicated by the shift_len signal 1250. Another bit sequence of the width given by N−(width 1240+shift_len 1250) and that includes the least-significant bit of the data A 1100 remains unshifted, and the bits corresponding to the second sign extension area 1270 of FIG. 13 is given a logical value of zero. Thus, the data B 1130 are generated.

(Operations)

The characteristic operation of the data processing device 100 is bit manipulation. The following describes the bit manipulation operations with reference to the accompanying drawings.

(Bit Manipulation Operations)

The bit manipulation operation is performed when the instruction fetch unit 110 (see FIG. 1) fetches a bit manipulation instruction from the external memory, in cooperation with the instruction decoder 120, the register file 140, and the bit manipulation circuit 150.

Figure 14:
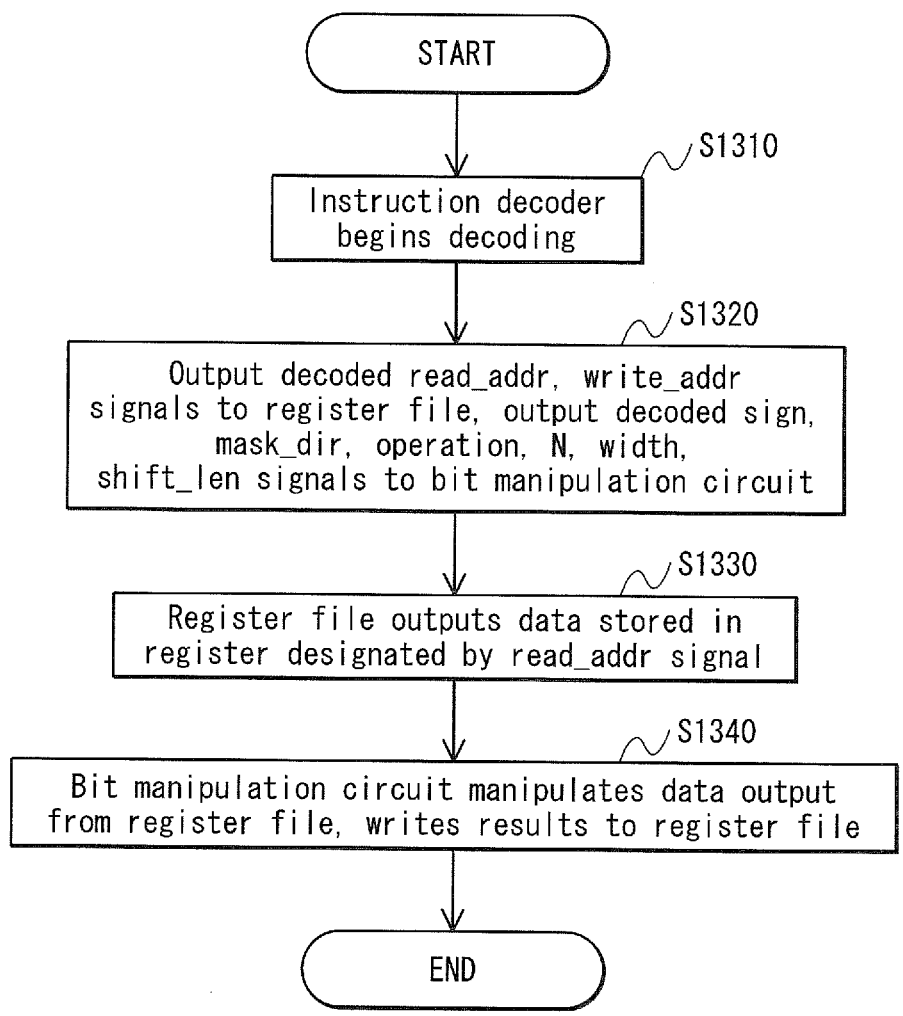
FIG. 14 is a flowchart of a bit manipulation operation performed by the data processing device 100.

FIG. 14 is a flowchart of the bit manipulation operation performed by the data processing device 100.

The bit manipulation operation begins with the instruction fetch unit 110 fetching the bit manipulation instruction from the external memory.

Upon fetching the bit manipulation instruction from the external memory, the instruction fetch unit 110 outputs the bit manipulation instruction so fetched to the instruction decoder 120. The instruction decoder 120 then begins to decode the bit manipulation instruction input thereto (step S1310).

Upon decoding the bit manipulation instruction, the instruction decoder 120 outputs the decoded read_addr and write_addr signals to the register file 140, and outputs the decoded sign, mask_dir, operation, N, width, and shift_len signals to the bit manipulation circuit 150 (step S1320).

Upon input of the read_addr signal from the instruction decoder 120, the register file 140 outputs the data stored in the register designated by the read_addr signal (step S1330).

The bit manipulation circuit 150 executes bit manipulation on the data input from the register file 140 in accordance with the sign, mask_dir, operation, N, width, and shift_len signals input by the instruction decoder 120, then stores the data thus generated in the register file 140 at the address indicated by the write_addr signal (step S1340).

Once step S1340 is complete, the data processing device 100 ends the bit manipulation operation.

(Discussion)

The data processing device 100 is able to perform an upper-bound unpacking operation with a single instruction.

A specific example of the upper-bound unpacking operation performed by the data processing device 100 is described below, with reference to the drawings.

In the following example, the upper-bound unpacking operation is performed on 32-bit data stored in a first register within the register file 140. The results thereof are stored in a second register within the register file 140.

Figure 15:
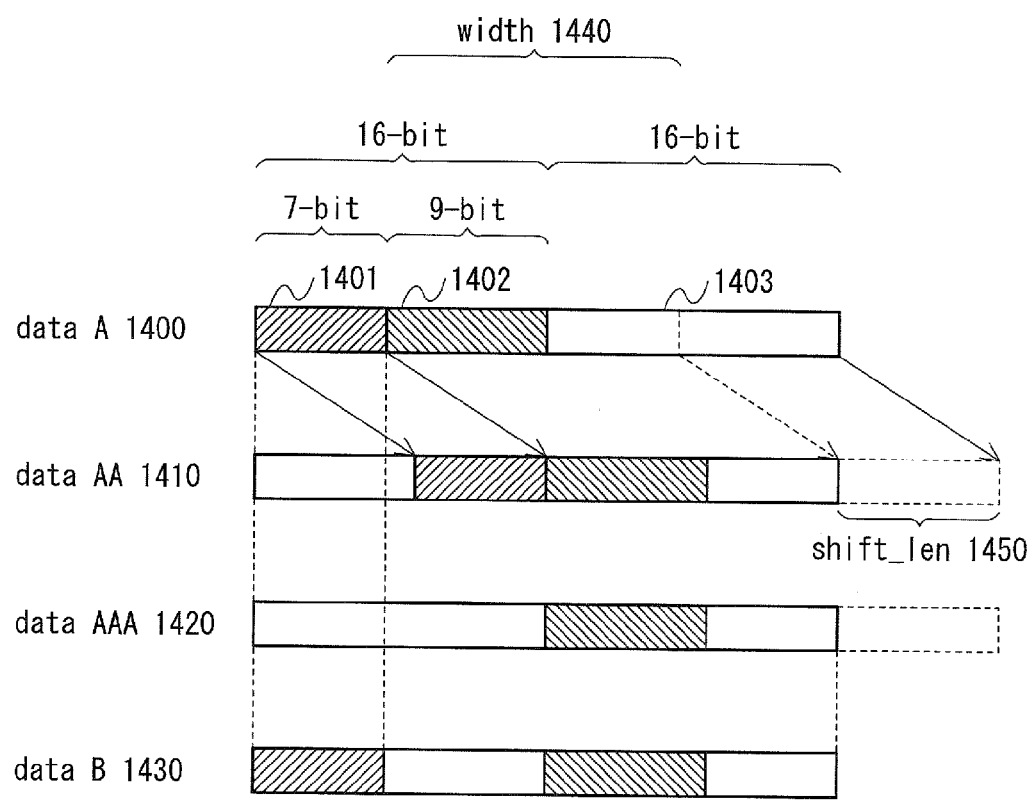
FIG. 15 is a data configuration diagram for a specific example.

FIG. 15 is a data structure diagram indicating the structure of the data used and generated by the bit manipulation circuit 150 in this example.

As shown, the data A 1400 are stored in the first register within the register file 140 and include a 16-bit sequence made up of a 7-bit valid sequence 1401 and a 9-bit valid sequence 1402, as well as a 16-bit unnecessary bit sequence 1403 having a logical value of zero, for a total of 32 bits.

The data AA 410 are a sequence of 32 bits output by the left and right shifter 320 (see FIG. 4), and correspond to the data A 1400 input from the register file 140. The data AAA 1420 are a sequence of 32 bits output from the sign extension circuit 330, and correspond to the data AA 1410 input from the left and right shifter 320. The data B 1430 are a sequence of 32 bits output from the first bit selector 360, and correspond to the data AAA output from the sign extension circuit 330. The width signal 1440 is the span of bits designated by the decoded width signal input from the instruction decoder 120. In this example, the value of the width signal 1440 is 16. The shift_len signal 1450 is the shift length designated by the decoded shift_len signal input from the instruction decoder 120. In this example, the value of the shift_len is 9.

When the data A 1400 are stored in the first register within the register file 140, the opcode extrh32 is input to the instruction decoder 120 such that operand B is the name of the second register, operand A is the name of the first register, operand shift_len is the length of the 9-bit valid bit sequence 1402, and operand width is the bit-unit length of the data after the unpacking operation, i.e., 16. The data processing device 100 begins the bit manipulation operation, which is the upper-bound unpacking operation in the present example.

Once the bit manipulation operation begins, the instruction decoder 120 outputs the decoded signals to the bit manipulation circuit 150, and the register file 140 outputs the data A 1400 stored in the first register to the bit manipulation circuit 150.

Upon input of the decoded signals and the data A 1400 to the bit manipulation circuit 150, the left and right shifter 320 (see FIG. 4) shifts the data A 1400 rightward by nine bits as designated by the shift_len signal 1450, without involving sign extension, and outputs the data AA 1410.

Also, upon input of the decoded signals, the decoder 450 outputs an ext_mask signal in which a bit sequence that includes the least-significant bit and is 16 bits in length as designated by the width signal 1040 has a logical value of one, and all other bits have a logical value of zero. The second bit selector 460 then selects a 16-bit sequence from the data AA 1410 that includes the least-significant bit, selects a logical value of zero for all other bits, and thus generates the data AAA 1420 for output.

Also, the mask data generation circuit 350 outputs a mask signal to the first bit selector 360, in which the width 1440 (i.e., 16)+shift_len 1450 (i.e., 9)=25 least-significant bits have a logical value of one, and all other bits have a logical value of zero.

Accordingly, the first bit selector 360 selects a bit sequence that includes the least-significant bit in a 25-bit sequence from the data AAA 1420, selects all other bits from the data A 1400, and outputs the whole as the data B 1430.

Subsequently, the register file 140 stores the data B 1430 output by the bit manipulation circuit 150 in the second register.

As such, the data processing device 100 is able to execute the upper-bound unpacking operation in a single instruction, such that the 7-bit valid sequence 1401 and the 9-bit valid sequence 1402, which are the first 16 bits of the data stored in the first register, are respectively stored in the second register and arranged therein as a 16-bit leading sequence.

Embodiment 2

A data processing device 1500 that is a partially modified version of the data processing device 100 of Embodiment 1 is described below, as an Embodiment of a data processing device pertaining to the present disclosure.

The data processing device 1500 includes a plurality of bit manipulation circuits, each identical to the bit manipulation circuit 150 of Embodiment 1. The plurality of bit manipulation circuits are executed in parallel so as to perform Single-Instruction Multi-Data (SIMD) processing.

The configuration of the data processing device 1500 pertaining to Embodiment 2 is described below with reference to the accompanying drawings, and with particular attention to the points of difference from the data processing device 100 of Embodiment 1.

(Data Processing Device 1500 Configuration)

Figure 16:
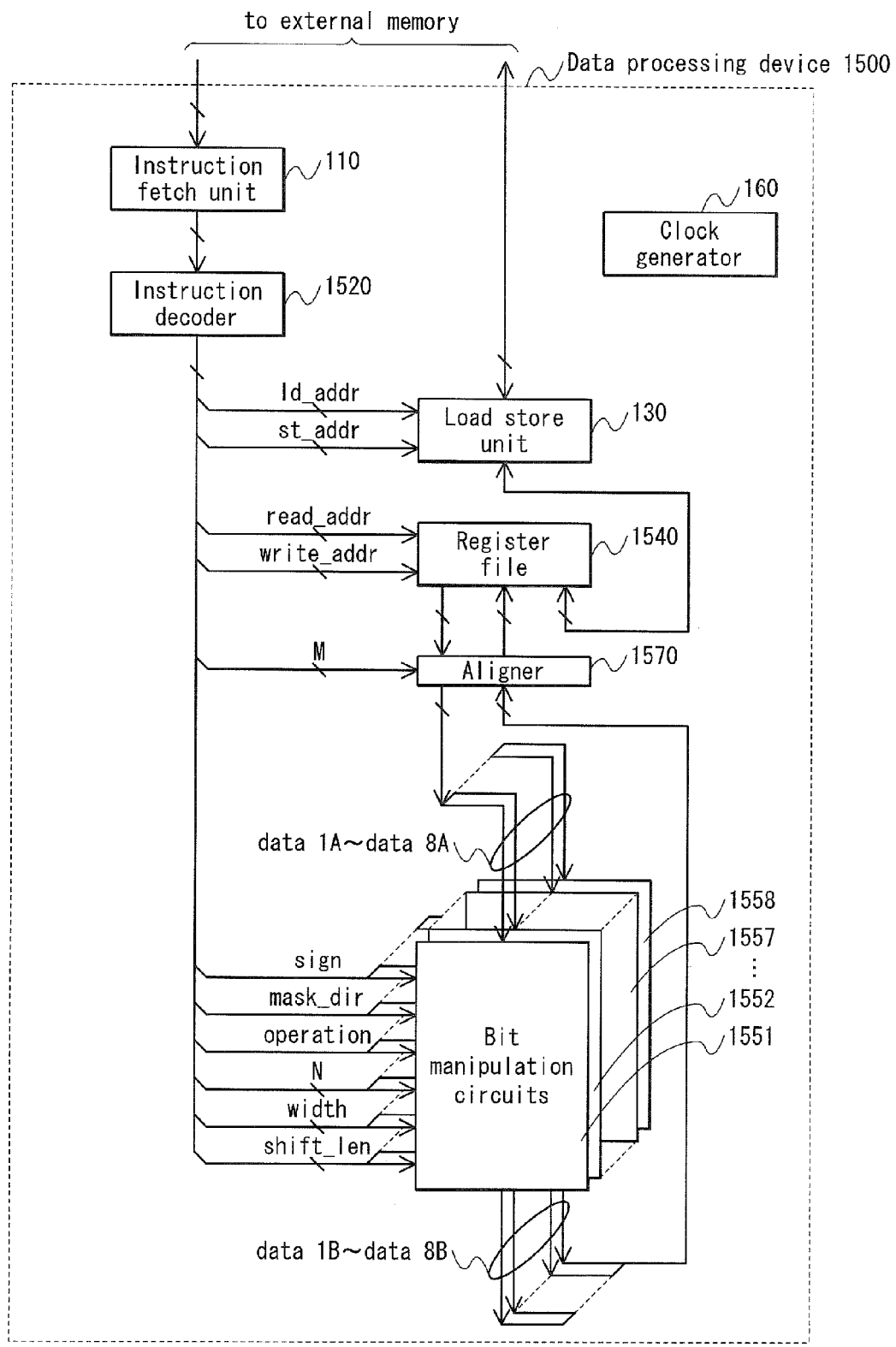
FIG. 16 is a block diagram illustrating the principal hardware configuration of a data processing device 1500.

FIG. 16 is a block diagram illustrating the principal hardware configuration of the data processing device 1500.

As shown, the data processing device 1500 is configured similarly to the data processing device 100 of Embodiment 1, differing in that the instruction decoder 120 is replaced by an instruction decoder 1520, the register file 140 is replaced by a register file 1540, an aligner 1570 is added, and eight bit manipulation circuits are provided, specifically a first bit manipulation circuit 1551 through an eighth bit manipulation circuit 1558.

The instruction decoder 1520 is a variant of the instruction decoder 120 of Embodiment 1, with the additional function of decoding SIMD bit manipulation instructions.

FIG. 17 presents a decoded signal correspondence table 1600 indicating the correspondence between the SIMD bit manipulation instruction to be decoded by the instruction decoder 1520 and the decoded signals.

As shown, an instruction format column 1610 indicates the instruction format for each SIMD bit manipulation instruction to be decoded, in mnemonic form.

Each SIMD bit manipulation instruction has one of six types of opcode. These are: a shrnhN×M instruction using a shrnhN×M (where N is one of 8, 16, and 32, and M is one of 2, 4, and 8; this applies throughout) opcode, a shrnlN×M instruction using a shrnlN×M opcode, a shrnlsN×M instruction using a shrnlsN×M opcode, an extrhN×M instruction using an extrhN×M opcode, an extrlN×M instruction using an extrlN×M opcode, and an extrlsN×M instruction using an extrlsN×M opcode.

Each instruction has operands including a register name B designating a destination register in the register file 1540, a register name A designating a source register in the register file 1540, a shift_len field indicating a first bit-length that is less than N bits, and a width field indicating a second bit-length that is less than N bits.

The sign column 1620, the mask_dir column 1630, the operation column 1640, the N column 1650, the M column 1655, the width column 1660, the shift_len column 1670, the read_addr column 1680, and the write_addr column 1690 respectively indicate the decoded signal output when the instruction decoder 120 decodes each such bit manipulation instruction.

The decoded sign 1620, mask_dir 1630, operation 1640, N 1650, width 1660, shift_len 1670, read_addr 1680, and write_addr 1690 signals respectively correspond to the sign 220, mask_dir 230, operation 240, N 250, width 260, shift_len 270, read_addr 280, and write_addr 290 signals of Embodiment 1. Accordingly, the explanations thereof are omitted.

The M 1655 signal is a 4-bit signal indicating a binary value M included in the opcode, and is output to the register file 1540. The M 1655 signal indicates the quantity of registers to be read from or written to when data is read from or written to the register file 1540.

The explanation of the data processing device 1500 continues below, with reference to FIG. 16.

The register file 1540 is a variant of the register file 140 of Embodiment 1, modified into 16 general-purpose registers, each handling a length of four to eight bytes.

The aligner 1570 is connected to the instruction decoder 120, the register file 1540, and to the first bit manipulation circuit 1551 through the eighth bit manipulation circuit 1558, and has the following six functions.

Function 1: When the M signal 1655 is input from the instruction decoder 1520 and indicates a value of two, and a 64-bit sequence is input from the register file 1540, to output the first 32 bits of the input bit sequence to the first bit manipulation circuit 1551 and to output the last 32 bits of the input bit sequence to the second bit manipulation circuit 1552.

Function 2: When the M signal 1655 is input from the instruction decoder 1520 and indicates a value of two, a 32-bit sequence (hereinafter, sequence A) is input from the first bit manipulation circuit 1551, and a 32-bit sequence (hereinafter, sequence B) is input from the second bit manipulation circuit 1552, to generate a 64-bit sequence in which sequence A forms the first half and sequence B forms the second half, and to output the result to the register file 1540.

Function 3: When the M signal 1655 is input from the instruction decoder 1520 and indicates a value of four and a 64-bit sequence is input from the register file 1540, to perform a head bit extension on a first set of 16 bits of the input bit sequence so as to generate a 32-bit sequence and output the result to the first bit manipulation circuit 1551, to perform a head bit extension on a second set of 16 bits of the input bit sequence so as to generate a 32-bit sequence and output the result to the second bit manipulation circuit 1552, to perform a head bit extension on a third set of 16 bits of the input bit sequence so as to generate a 32-bit sequence and output the result to the third bit manipulation circuit 1553, and to perform a head bit extension on the last set of 16 bits of the input bit sequence so as to generate a 32-bit sequence and output the result to the fourth bit manipulation circuit 1554. The bit extension is, for example, executed by inserting logical values of zero in the extended portions.

Function 4: When the M signal 1655 is input from the instruction decoder 1520 and indicates a value of four, a 16-bit sequence (hereinafter, sequence C) is input from the first bit manipulation circuit 1551, a 16-bit sequence (hereinafter, sequence D) is input from the second bit manipulation circuit 1552, a 16-bit sequence (hereinafter, sequence E) is input from the third bit manipulation circuit 1553, and a 16-bit sequence (hereinafter, sequence F) is input from the fourth bit manipulation circuit 1554, to generate a 64-bit sequence in which sequences C, D, E, and F are included in the stated order, and to output the result to the register file 1540.

Function 5: When the M signal 1655 is input from the instruction decoder 1520 and indicates a value of eight and a 64-bit sequence is input from the register file 1540, to perform a head bit extension on a first set of eight bits of the input bit sequence so as to generate a 32-bit sequence and output the result to the first bit manipulation circuit 1551, to perform a head bit extension on a second set of eight bits of the input bit sequence so as to generate a 32-bit sequence and output the result to the second bit manipulation circuit 1552, to perform a head bit extension on a third set of eight bits of the input bit sequence so as to generate a 32-bit sequence and output the result to the third bit manipulation circuit 1553, to perform a head bit extension on a fourth set of eight bits of the input bit sequence so as to generate a 32-bit sequence and output the result to the fourth bit manipulation circuit 1554, to perform a head bit extension on a fifth set of eight bits of the input bit sequence so as to generate a 32-bit sequence and output the result to the fifth bit manipulation circuit 1555, to perform a head bit extension on a sixth set of eight bits of the input bit sequence so as to generate a 32-bit sequence and output the result to the sixth bit manipulation circuit 1556, to perform a head bit extension on a seventh set of eight bits of the input bit sequence so as to generate a 32-bit sequence and output the result to the seventh bit manipulation circuit 1557, and to perform a head bit extension on the last eight bits of the input bit sequence so as to generate a 32-bit sequence and output the result to the eighth bit manipulation circuit 1558. The bit extension is, for example, executed by inserting logical values of zero in the extended portions.

Function 6: When the M signal 1655 is input from the instruction decoder 1520 and indicates a value of eight, an 8-bit sequence (hereinafter, sequence G) is input from the first bit manipulation circuit 1551, an 8-bit sequence (hereinafter, sequence H) is input from the second bit manipulation circuit 1552, an 8-bit sequence (hereinafter, sequence I) is input from the third bit manipulation circuit 1553, an 8-bit sequence (hereinafter, sequence J) is input from the fourth bit manipulation circuit 1554, an 8-bit sequence (hereinafter, sequence K) is input from the fifth bit manipulation circuit 1555, an 8-bit sequence (hereinafter, sequence L) is input from the sixth bit manipulation circuit 1556, an 8-bit sequence (hereinafter, sequence M) is input from the seventh bit manipulation circuit 1557, and an 8-bit sequence (hereinafter, sequence N) is input from the eighth bit manipulation circuit 1558, to generate a 64-bit sequence including sequences G, H, I, J, K, L, M, and N in the stated order, and to output the result to the register file 1540.

The first through eighth bit manipulation circuits 1551-1558 are each configured identically to the bit manipulation circuit 150 of Embodiment 1, are each connected to the instruction decoder 1520 and the aligner 1570, and all take the same signals decoded by the instruction decoder 1520 as input (Summary)

The data processing device 1500 configured according to the above is able to execute processing identical to the single-instruction bit manipulation operation performed by the data processing device 100 of Embodiment 1, in parallel on data stored in the register file 1540. That is, SIMD bit manipulation operation is achievable thereby.

Embodiment 3

A data processing device 1700 that is a partially modified version of the data processing device 100 of Embodiment 1 is described below, as an Embodiment pertaining to the present disclosure.

When the instruction decoder decodes an instruction having an extrhN, extrlN, or extrlsN opcode (hereinafter termed extension instructions), the data processing device 1700 executes a pre-unpacking operation on the data output by the register file and inputs the result to the bit manipulation circuit. When the instruction decoder decodes an instruction having a shrnhN, shrnlN, or shrnlsN opcode (hereinafter termed shrinkage instructions), the data processing device 1700 executes a post-packing operation on the data output from the bit manipulation circuit and inputs the result to the register file.

The pre-unpacking operation involves zero-extension or sign extension of the length of the bit sequence subject to the unpacking operation. The post-packing operation involves invalidation of the unnecessary bit sequence in the bit sequence subject to the packing operation.

The configuration of the data processing device 1700 pertaining to Embodiment 3 is described below with reference to the accompanying drawings, and with particular attention to the points of difference from the data processing device 100 of Embodiment 1.

(Data Processing Device 1700 Configuration)

Figure 18:
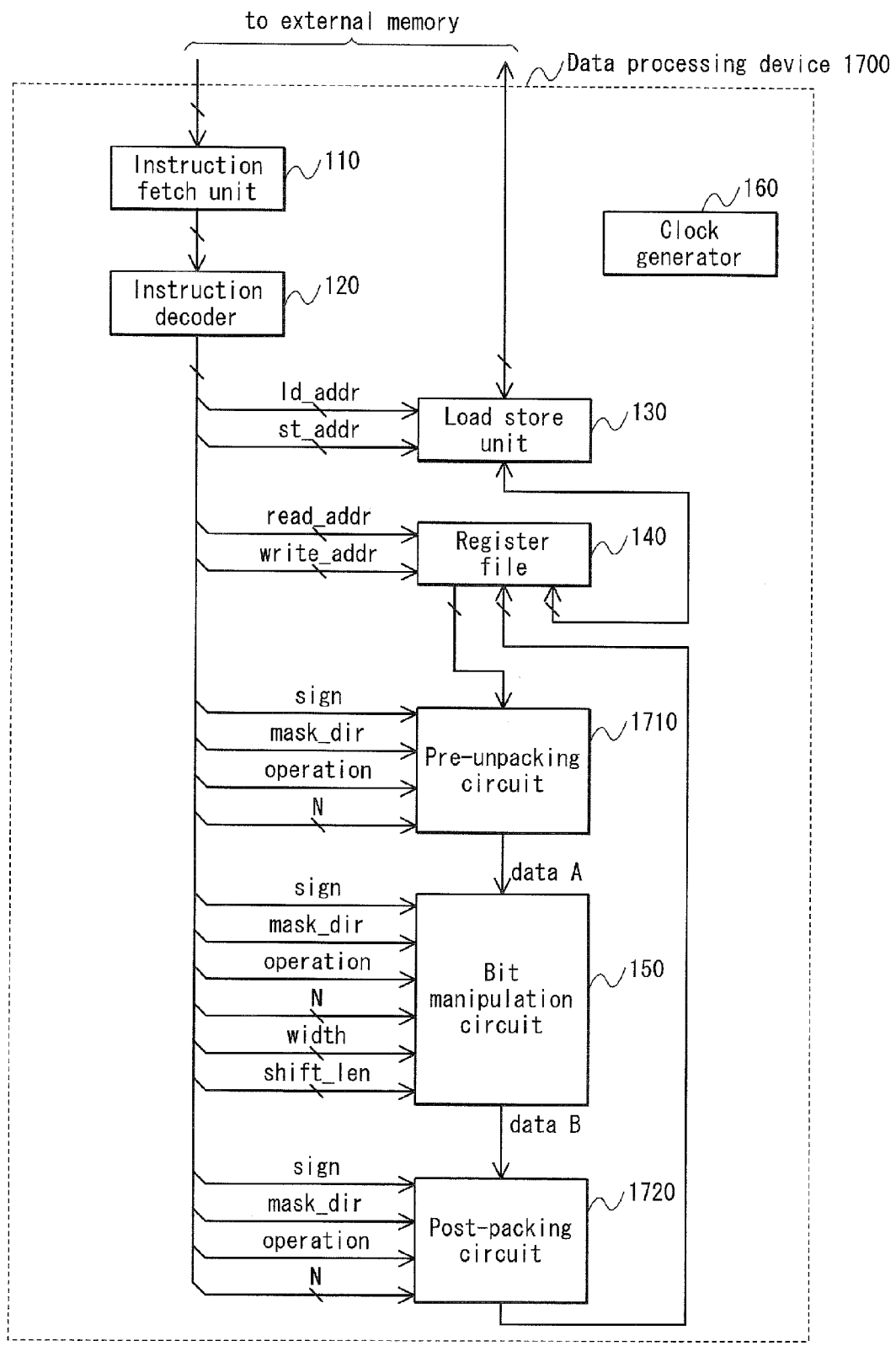
FIG. 18 is a block diagram illustrating the principal hardware configuration of a data processing device 1700.

FIG. 18 is a block diagram illustrating the principal hardware configuration of the data processing device 1700.

As shown, the data processing device 1700 is a variant of the data processing device 100 of Embodiment 1, differing in that a pre-unpacking circuit 1710 and a post-packing circuit 1720 are added thereto.

The pre-unpacking circuit 1710 is connected to the instruction decoder 120, the register file 140, and the bit manipulation circuit 150, and has the following four pre-unpacking functions.

Pre-unpacking Function 1: When the instruction decoder 120 has decoded an extension instruction, inputs a decoded sign signal having a logical value of zero, and inputs a decoded mask_dir signal having a logical value of zero, to shift a bit sequence that includes the last N/2 bits among the last N bits of a 32-bit sequence input from the register file 140 leftward by N/2 bits, to subsequently insert a bit sequence having a logical value of zero into a bit sequence that includes the least-significant bit so that the length of the sequence is N/2, and to output the results.

Pre-unpacking Function 2: When the instruction decoder 120 has decoded an extension instruction, inputs a decoded sign signal having a logical value of zero, and inputs a decoded mask_dir signal having a logical value of one, to insert a bit sequence that includes the most-significant bit and has a logical value of zero into a bit sequence that includes the last N bits of a 32-bit sequence input from the register file 140 so that the length of the sequence is N/2, and to output the results.

Pre-unpacking Function 3: When the instruction decoder 120 has decoded an extension instruction, and inputs a decoded sign signal having a logical value of zero, to insert a copy of a bit sequence that includes the least-significant bit and has a length of N/2 into a bit sequence that includes the first N/2 bits among the last N bits of a 32-bit sequence input from the register file 140, and to output the results.

Pre-unpacking Function 4: When the instruction decoder 120 has decoded a shrinkage instruction, to output a 32-bit sequence input from the register file 140 as-is.

The post-packing circuit 1720 is connected to the instruction decoder 120, the register file 140, and the bit manipulation circuit 150, and has the following three post-packing functions.

Post-packing Function 1: When the instruction decoder 120 has decoded a shrinkage instruction and outputs a decoded mask_dir signal having a logical value of zero, to shift a bit sequence that includes the last N/2 bits among the last N bits of a 32-bit sequence input from the bit manipulation circuit 150 rightward by N/2 bits, to subsequently insert a bit sequence having a logical value of zeroes into a bit sequence that includes the most-significant bit so that the length of the sequence is N/2, and to output the results.

Post-packing Function 2: When the instruction decoder 120 has decoded a shrinkage instruction and outputs a decoded mask_dir signal having a logical value of one, to insert an invalid bit sequence that includes the most-significant bit and has a logical value of zero into a bit sequence that includes the last N bits of a 32-bit sequence input from the bit manipulation circuit 150 so that the length of the sequence is N/2, and to output the results.

Post-packing Function 3: When the instruction decoder 120 has decoded a shrinkage instruction, to output a 32-bit sequence input from the bit manipulation circuit 150 as-is.

(Summary)

When the instruction decoder 120 has decoded an extension instruction, the data processing device 1700, configured as described above, has a bit manipulation circuit 150 executing bit manipulation after the pre-unpacking circuit 1710 has executed a pre-unpacking process. Also, when instruction decoder 120 has decoded a shrinkage instruction, the data processing device 1700 also has a post-packing circuit 1720 execute a post-packing operation after the bit manipulation circuit 150 has performed bit manipulation.

(Supplement)

Although the data processing device pertaining to the present disclosure has been described using the examples of data processing devices given in Embodiments 1 and 2, no limitation is intended. The following variations are also possible.

(1) In Embodiment 1, the instructions decoded by the instruction decoder 120 are described as being four bytes, i.e., 32 bits, in length. However, no limitation is intended. A configuration using, for example, 64-bit instructions is also possible, provided that such instructions are expressible by the bit manipulation instruction. Furthermore, the instructions decoded by the instruction decoder may be of variable length.

(2) In Embodiment 1, the bit manipulation circuit 150 is described as performing bit manipulation operations on 32-bit data. However, no limitation is intended. The bit manipulation operations may also be performed on, for example, 128-bit or 16-bit data, provided that the bit manipulation operations are performed in accordance with the signals decoded by the instruction decoder 120.

(3) In Embodiment 1, the N in the opcodes is described as being equal to one of 8, 16, and 32. However, no such limitation is intended. N may also be equal to 12, for example, provided that N remains lower than the length of the data subject to bit manipulation operation by the bit manipulation circuit 150.

(4) In Embodiment 1, the register file 140 is described as having 16 registers. However, no such limitation is intended. The register file 140 may have, for example, 32 registers, provided that the registers are readable and writable in accordance with the signals decoded by the instruction decoder 120.

(5) In Embodiment 1, the bit manipulation circuit 150 is described as configured according to FIGS. 4 and 5. However, no such limitation is intended. Other configurations are also possible, provided that the functions of the circuits shown in FIGS. 4 and 5 are preserved. For example, a logic synthesis circuit, obtainable by using a logic synthesis tool, may be used with resister transfer language (RTL) describing functions identical to those of the bit manipulation circuit 150 from FIGS. 4 and 5.

(6) In Embodiment 1, the relationship between the mask_dir, operation, and shift_dir signals are such that any given two of the three signals determine the third signal.

Thus, although Embodiment 1 is described in an example where the data processing device 100 is configured such that the instruction decoder 120 outputs decoded mask_dir and operation signals, and the bit manipulation circuit 150 generates and uses a shift_dir signal based thereon, no such limitation is intended. The instruction decoder 120 may output any two decoded signals among the mask_dir, operation, and shift_dir signals, such that the bit manipulation circuit 150 generates and outputs the remaining signal.

Furthermore, the instruction decoder 120 need not necessarily output two decoded signals among the mask_dir, operation, and shift_dir signals, provided that (1) each instruction decoded thereby is one of a shrinkage instruction and an extension instruction, and (2) the bit sequence that remains unshifted is specified as including one of the most-significant bit and the least-significant bit. For example, a configuration may be used in which two signals are decoded, one being a signal indicating whether the instruction is a shrinkage instruction or an extension instruction (operation), and one indicating whether the direction of the shift to be performed on the target bit sequence is toward the most- or least-significant bit.

(7) In Embodiment 1, the relationship between the width, shift_len, and mask_width signals is such that any given two of the signals determine the third signal.

Thus, although Embodiment 1 is described in an example where the data processing device 100 is configured such that the instruction decoder 120 outputs decoded width and shift_len signals, and the bit manipulation circuit 150 generates and uses a mask_width signal based thereon, no limitation is intended. The instruction decoder 120 may output any two decoded signals among the width, shift_len, and mask_width signals, such that the bit manipulation circuit 150 generates and outputs the remaining signal Furthermore, the instruction decoder 120 need not necessarily output two decoded signals among the mask_dir, operation, and shift_dir signals, provided that each instruction decoded thereby specifies the length of the bit sequence to be shifted and of the bit sequence that remains unshifted. For example, a configuration may be used in which two signals are decoded, one indicating the length of the bit sequence to be shifted (width), and the other indicating the length of the bit sequence remaining unshifted. Further, a configuration may, for example, be used in which the two signals decoded are a signal indicating the length of the bit sequences remaining unshifted, and the other indicating the difference between the bit sequences to be shifted and remaining unshifted.

(8) In Embodiment 1, the bit manipulation instructions decoded by the instruction decoder 120 are described as independently indicating the source register and the destination register. However, no such limitation is intended. A single designation may be made, such that the source register and the destination register are the same register.

(9) In Embodiment 1, the data processing device 100 is described as storing the bit sequence subject to the bit manipulation operation in the register file 140. However, no such limitation is intended. A configuration in which, for example, a bit sequence stored in memory or a similar external storage device is subject to the bit manipulation operation, provided that an arbitrary memory area is designatable thereby.

(10) In Embodiment 2, the data processing device 1500 is described as including eight bit manipulation circuits. However, no such limitation is intended. For example, 16 bit manipulation circuits may be included, provided that the bit manipulation circuits operate in accordance with a common decoded signal from the instruction decoder 120.

(11) In Embodiment 3, the bit manipulation instructions subject to decoding by the instruction decoder 120 are described as configured according to the examples given in FIG. 3. However, no such limitation is intended. Compound instructions, which include a portion operating the pre-unpacking circuit 1710 and a portion operating the bit manipulation circuit 150 bundled as a single instruction, may also be used, provided that such instructions are decoded into control signals for the register file 140, the bit manipulation circuit 150, and the pre-unpacking circuit 1710. Also, the compound instructions may include a portion operating the post-packing circuit 1720 and a portion operating the bit manipulation circuit 150 bundled as a single instruction, may also be used, provided that such instructions are decoded into control signals for the register file 140, the bit manipulation circuit 150, and the post-packing circuit 1720.

(12) In Embodiment 1, the instruction decoder 120 of the data processing device 100 is described as decoding bit manipulation instruction made as indicated in the instruction format column 210 of FIG. 3. However, no such limitation is intended, provided that the instruction decoder 120 is able to output decoded signals that include all control signals needed by the bit manipulation circuit 150. For example, the instruction format shown in FIGS. 19A and 19B may also be used.

FIG. 19A is pseudocode in mnemonic form, indicating an instruction format used when an extension instruction is to be decoded. Similarly, FIG. 19B is pseudocode in mnemonic form indicating an instruction format used when a shrinkage instruction is to be decoded.

As shown, the instruction format is made up of one opcode and three operands.

The shift_length indicated by operands sh15 and sh25 may be in any format able to express a given value, and may also be in a format indicating one among a plurality of fixed shift lengths. Also, the bit length indicated by operands msk16 and msk26 may be in any format able to express a given value, and may also be in a format indicating one among a plurality of fixed bit lengths.

(13) Further Embodiments and variations of the data processing device pertaining to the present disclosure are described below, along with the effects thereof.

In one aspect, a data processing device comprises: a decoder operable to read an instruction for information specifying a bit sequence storage area in which an N-bit (N being an integer greater than or equal to two) target sequence is stored, information indicating a first bit range that includes a first end bit of a given N-bit sequence, and information indicating a second bit range that does not include a second end bit of the given N-bit sequence and that is contiguous with the first bit range, to decode the information so read, and to output a decoded signal in response to the information so read; and a bit manipulation circuit operable to, once the decoder outputs the decoded signal, generate and output an N-bit output sequence by manipulating the target sequence stored in the bit sequence storage area in accordance with the decoded signal, wherein the bit manipulation circuit generates the output sequence by arranging a bit sequence identical in value to the first bit range of the target sequence in the first bit range of the output sequence, arranging a bit sequence identical in value to the second bit range of the target sequence in a third bit range of the output sequence that is equal in length to the second bit range and that includes the second end bit of the output sequence, and filling a portion of the output sequence that belongs to neither of the first bit range and the third bit range with uniform bits of a predetermined value.

In the data processing device configured as given above, the bit manipulation circuit operating in response to the signal decoded from the instruction unpacks data packed in the first and second bit regions of a data sequence stored in the bit sequence memory by inserting a bit sequence composed of identical bits between the first and second bit regions, and then outputs the result. Thus, the data processing device is able to perform unpacking of packed data in a comparatively efficient manner.

Figure 20:
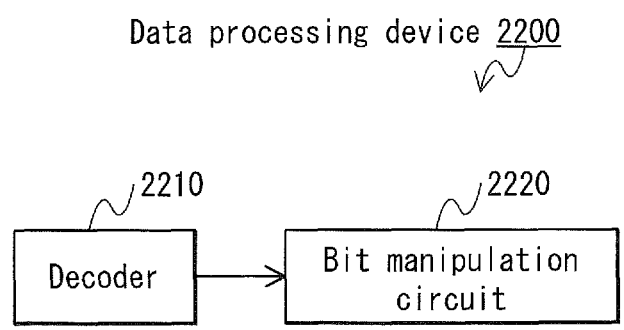
FIG. 20 is a block diagram illustrating the principal hardware configuration of a data processing device 2200.
Figure 21:
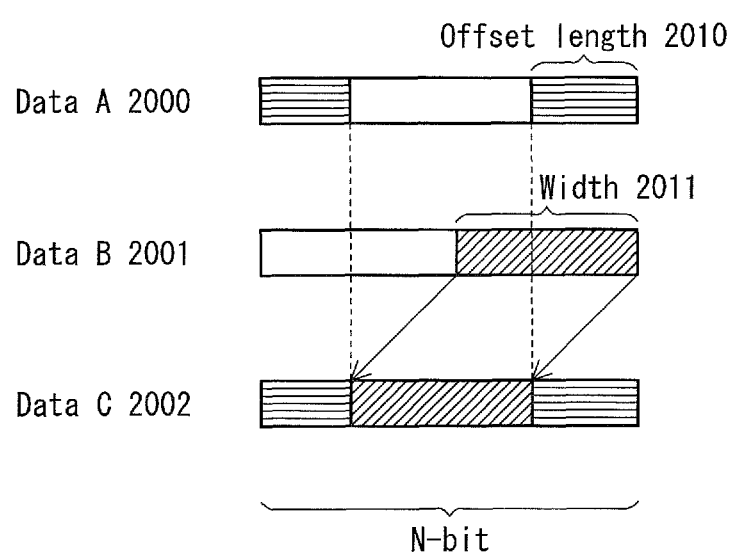
FIG. 21 is a data configuration diagram for a conventional bit field manipulation circuit A.
Figure 22:
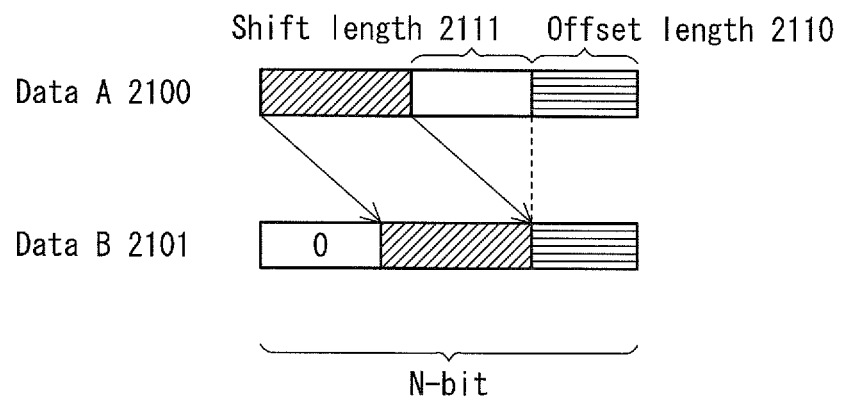
FIG. 22 is a data configuration diagram for a conventional bit field manipulation circuit B.

FIG. 20 is a block diagram indicating the configuration of a data processing device 2200 pertaining to the above variation.

As shown, the data processing device 2200 includes a decoder 2210 and a bit manipulation circuit 2220.

The decoder 2210 is connected to the bit manipulation circuit 2220, reads information designating a bit sequence storage area storing therein an N-bit sequence (N being an integer greater than or equal to two), information indicating a first bit range that includes a first end bit in the N-bit sequence, and information indicating a second bit range that is contiguous with the first bit range and does not include the second end bit in the N-bit sequence, and outputs decoded signals according to the information so read. For example, the above may be realized a s the instruction decoder 120 of Embodiment 1.

The bit manipulation circuit 2220 is connected to the decoder 2210, and is configured to generate and output an N-bit output sequence according to the bit sequence stored in the bit sequence storage area, in response to a decoded signal. The bit manipulation circuit 2220 generates the output sequence by arranging, in the first bit range, a bit sequence that has the same value as the first bit range, arranging a bit sequence that has the same value as the second bit range in a third bit range of the same length as the second bit range and including the second end bit, and arranging uniform predetermined values in a portion that does not belong to either of the first bit range and the second bit range. For example, the above may be realized as the bit manipulation circuit 150 of Embodiment 1.

In another aspect, the decoder further reads the instruction for sign extension information indicating whether or not a sign extension is to be performed, and outputs the decoded signal with a sign extension signal reflecting the sign extension information included therein, and when the sign extension signal included in the decoded signal output by the decoder indicates that the sign extension is to be performed, the bit manipulation circuit takes the predetermined value to be a most-significant bit value from one of the first bit range and the third bit range that is arranged at a less-significant bit position within the output sequence, and when the sign extension signal included in the decoded signal input from the decoder does not indicate that the sign extension is to be performed, the bit manipulation circuit takes the predetermined value to be zero.

According to the above configuration, the instruction decoded by the decoder includes sign extension information. Thus, one of a sign extension process and a zero-insertion process is designated for execution on the data processing device.

In a further aspect, the instruction subject to decoding by the decoder includes a length signal for specifying a first bit range length and a second bit range length, the decoder outputs the decoded signal with a decoded length signal reflecting the length signal included therein, and the bit manipulation circuit generates the output sequence in accordance with the decoded length signal included in the decoded signal output by the decoder.

According to this configuration, the lengths of the first bit range and the second bit range are designated using a length signal.

In an additional aspect, the length signal includes two signals selected from among a signal indicating the first bit range length, a signal indicating the second bit range length, and a signal indicating a difference, in bits, between the second bit range and the third bit range within an N-bit sequence.

According to this configuration, the respective lengths of the first and second bit ranges are designated using any two signals selected from among a signal indicating the length of the first bit range, a signal indicating the length of the second bit range, and a signal indicating the difference, in bits, between the second and third bit ranges.

In another additional aspect, the instruction subject to decoding by the decoder further includes an end bit signal for specifying whether the first end bit is a most-significant bit or a least-significant bit, the decoder outputs the decoded signal with a decoded end bit signal reflecting the end bit signal further included therein, and the bit manipulation circuit generates the output sequence in further accordance with the decoded end bit signal included in the decoded signal output by the decoder.

According to this configuration, the first end bit is designated as being one of a most-significant bit and a least-significant bit by using an end bit signal.

In still a further aspect, the decoder further reads the instruction for pre-unpacking information indicating whether or not a pre-unpacking operation is to be performed, and outputs the decoded signal with a pre-unpacking signal reflecting the pre-unpacking information included therein, and the bit manipulation circuit performs the pre-unpacking operation when the pre-unpacking signal included in the decoded signal output from the decoder indicates that the pre-unpacking operation is to be performed.

According to this configuration, the data processing device executes a pre-unpacking process through pre-unpacking information included in the instruction decoded by the decoder.

In yet a further aspect, an additional bit manipulation circuit operable to, once the decoder outputs the decoded signal, generate and output an additional N-bit output sequence by manipulating an additional N-bit target bit sequence stored in an additional bit sequence storage area associated with the bit sequence storage area, in accordance with the decoded signal, wherein the bit manipulation circuit generates the additional output sequence by arranging a bit sequence identical in value to the first bit range of the additional target sequence in the first bit range of the additional output sequence, arranging a bit sequence identical in value to the second bit range of the additional target bit sequence in a third bit range of the additional output sequence, and filling in a portion of the additional output sequence that belongs to neither of the first bit range and the third bit range with uniform bits of a predetermined value.

According to this configuration, the output bit sequence and the additional output bit sequence are generated and output according to a target bit sequence stored in the bit sequence storage area and a bit sequence stored in an additional bit sequence storage area, with a single instruction.

INDUSTRIAL APPLICABILITY

The data processing device is widely applicable to devices handling digital signals made up of a plurality of bits.

REFERENCE SIGNS LIST

100 Data processing device
110 Instruction fetch unit
120 Instruction decoder
130 Load store unit
140 Register file
150 Bit manipulation circuit
160 Clock generator

The invention claimed is:

1. A data processing device, comprising:
a decoder operable to read an instruction for information specifying a bit sequence storage area in which an N-bit (N being an integer greater than or equal to two) target sequence is stored, information indicating a first bit range that includes a first end bit of a given N-bit sequence, and information indicating a second bit range that does not include a second end bit of the given N-bit sequence and that is contiguous with the first bit range, to decode the information so read, and to output a decoded signal in response to the information so read; and
a bit manipulation circuit operable to, once the decoder outputs the decoded signal, generate and output an N-bit output sequence by manipulating the target sequence stored in the bit sequence storage area in accordance with the decoded signal, wherein
the bit manipulation circuit generates the output sequence by arranging a bit sequence identical in value to the first bit range of the target sequence in the first bit range of the output sequence, arranging a bit sequence identical in value to the second bit range of the target sequence in a third bit range of the output sequence that is equal in length to the second bit range and that includes the second end bit of the output sequence, and filling a portion of the output sequence that belongs to neither of the first bit range and the third bit range with uniform bits of a predetermined value.

2. The data processing device of claim 1, wherein
the decoder further reads the instruction for sign extension information indicating whether or not a sign extension is to be performed, and outputs the decoded signal with a sign extension signal reflecting the sign extension information included therein, and
when the sign extension signal included in the decoded signal output by the decoder indicates that the sign extension is to be performed, the bit manipulation circuit takes the predetermined value to be a most-significant bit value from one of the first bit range and the third bit range that is arranged at a less-significant bit position within the output sequence, and when the sign extension signal included in the decoded signal input from the decoder does not indicate that the sign extension is to be performed, the bit manipulation circuit takes the predetermined value to be zero.

3. The data processing device of claim 2, wherein
the instruction subject to decoding by the decoder includes a length signal for specifying a first bit range length and a second bit range length,
the decoder outputs the decoded signal with a decoded length signal reflecting the length signal included therein, and
the bit manipulation circuit generates the output sequence in accordance with the decoded length signal included in the decoded signal output by the decoder.

4. The data processing device of claim 3, wherein
the length signal includes two signals selected from among a signal indicating the first bit range length, a signal indicating the second bit range length, and a signal indicating a difference, in bits, between the second bit range and the third bit range within an N-bit sequence.

5. The data processing device of claim 3, wherein
the instruction subject to decoding by the decoder further includes an end bit signal for specifying whether the first end bit is a most-significant bit or a least-significant bit,
the decoder outputs the decoded signal with a decoded end bit signal reflecting the end bit signal further included therein, and
the bit manipulation circuit generates the output sequence in further accordance with the decoded end bit signal included in the decoded signal output by the decoder.

6. The data processing device of claim 2, wherein
the decoder further reads the instruction for pre-unpacking information indicating whether or not a pre-unpacking operation is to be performed, and outputs the decoded signal with a pre-unpacking signal reflecting the pre-unpacking information included therein, and
the bit manipulation circuit performs the pre-unpacking operation when the pre-unpacking signal included in the decoded signal output from the decoder indicates that the pre-unpacking operation is to be performed.

7. The data processing device of claim 1, further comprising
an additional bit manipulation circuit operable to, once the decoder outputs the decoded signal, generate and output an additional N-bit output sequence by manipulating an additional N-bit target bit sequence stored in an additional bit sequence storage area associated with the bit sequence storage area, in accordance with the decoded signal, wherein
the bit manipulation circuit generates the additional output sequence by arranging a bit sequence identical in value to the first bit range of the additional target sequence in the first bit range of the additional output sequence, arranging a bit sequence identical in value to the second bit range of the additional target bit sequence in a third bit range of the additional output sequence, and filling in a portion of the additional output sequence that belongs to neither of the first bit range and the third bit range with uniform bits of a predetermined value.

8. A data processing method executed by a data processing device that includes a decoder decoding an instruction and a bit manipulation circuit operating in accordance with a decoded signal output by the decoder, comprising:
a decoding step of reading an instruction for information specifying a bit sequence storage area in which an N-bit (N being an integer greater than or equal to two) target sequence is stored, information indicating a first bit range that includes a first end bit of a given N-bit sequence, and information indicating a second bit range that does not include a second end bit of the given N-bit sequence and that is contiguous with the first bit range, decoding the information so read, and outputting a decoded signal in response to the information so read; and
a bit manipulation step of, once the decoder outputs the decoded signal, the bit manipulation circuit generating and outputting an N-bit output sequence by manipulating the target sequence stored in the bit sequence storage area in accordance with the decoded signal, wherein
the bit manipulation step involves generating the output sequence by arranging a bit sequence identical in value to the first bit range of the target sequence in the first bit range of the output sequence, arranging a bit sequence identical in value to the second bit range of the target sequence in a third bit range of the output sequence that is equal in length to the second bit range and that includes the second end bit of the output sequence, and filling a portion of the output sequence that belongs to neither of the first bit range and the third bit range with uniform bits of a predetermined value.

* * * * *